(12) United States Patent
Tamanoi et al.

(10) Patent No.: US 6,333,899 B1
(45) Date of Patent: Dec. 25, 2001

(54) HIGH DENSITY MAGNETO-OPTICAL RECORDING MEDIUM AND PRODUCTION METHOD THEREOF

(75) Inventors: Ken Tamanoi, Kawasaki; Yoshihiro Muto, Tokyo, both of (JP)

(73) Assignees: Fujitsu Limited, Kawasaki; Sony Corporation, Tokyo, both of (JP)

( * ) Notice: Subject to any disclaimer, the term of this patent is extended or adjusted under 35 U.S.C. 154(b) by 0 days.

(21) Appl. No.: 09/429,313

(22) Filed: Oct. 28, 1999

(30) Foreign Application Priority Data

Oct. 30, 1998 (JP) .................................................. 10-311459
Oct. 19, 1999 (JP) .................................................. 11-297381

(51) Int. Cl.$^7$ .................................................. G11B 11/00
(52) U.S. Cl. .................................... 369/13; 428/694 MM
(58) Field of Search ....................... 369/13, 14, 275.2, 369/275.4, 110.01, 116, 288; 428/694 MM, 694 RE, 694 ML, 694 EC, 694 SC

(56) References Cited

U.S. PATENT DOCUMENTS 5,623,458 * 4/1997 Matsumoto et al. .................... 369/13
5,640,374 * 6/1997 Hirokane et al. ....................... 369/13
5,754,500 * 5/1998 Tanaka et al. .......................... 369/13

FOREIGN PATENT DOCUMENTS

| | | |
|---|---|---|
| 420587 | 4/1991 | (EP) . |
| 492553 | 7/1992 | (EP) . |
| 498435 | 8/1992 | (EP) . |
| 583720 | 2/1994 | (EP) . |
| 698881 | 2/1996 | (EP) . |
| 785545 | 7/1997 | (EP) . |
| 7244877 | 9/1995 | (JP) . |

* cited by examiner

*Primary Examiner*—Ali Neyzari
(74) *Attorney, Agent, or Firm*—Greer, Burns & Crain, Ltd.

(57) ABSTRACT

A magneto-optical recording medium having a magnetic film stack structure includes a recording layer, a reproducing layer, and an intermediate layer formed between the recording layer and the reproducing layer. The intermediate layer has an easy magnetization characteristic along an in-plane direction at room temperature.

20 Claims, 22 Drawing Sheets

HIGH DENSITY MAGNETO-OPTICAL RECORDING MEDIUM AND PRODUCTION METHOD THEREOF

BACKGROUND OF THE INVENTION

The present invention relates to a magneto-optical recording medium such as a magneto-optical disk, a magneto-optical tape and a magneto-optical card, and more particularly, it relates to a magneto-optical recording medium capable of magnetically induced super resolution reproduction and a method of manufacturinging a magneto-optical recording medium.

A magneto-optical disk is regarded as a leading memory for storing massive data in the multimedia age ahead, and its recording capacity is desired to further increase. In order to increase the recording density of a magneto-optical disk, it is necessary to make a recording mark length shorter than a spot diameter of a laser beam as well as to reduce the interval between recording marks. It is comparatively easy to form such a small recording mark. However, in reproducing a small recording mark, there is a limit in a reproducible recording mark length because of restriction of the wavelength $\lambda$ of the laser beam used in the reproduction and the numerical aperture NA of an objective lens.

Therefore, a method of magnetically induced super resolution (MSR) reproduction for reproducing a mark to be reproduce in a laser spot by masking marks except the mark to be reproduce with a initializing magnetic field and a reproducing magnetic field has been proposed, the marks being recorded smaller than a laser spot diameter.

As a countermeasure, the present Applicant has proposed Japanese Patent Application Laid-Open No. 7-244877 (U.S. Pat. No. 5,623,458) as an MSR reproducing method which is an improvement over the above-mentioned method. In this reproducing method, data is read from an intermediate temperature area under application of a reproducing magnetic field of several hundreds Oe, namely, a double mask is formed in a low temperature area and a high temperature area, so as to realize high resolution reproduction without using an initialization magnet. The magneto-optical disk used in this reproducing method includes a reproducing layer, an intermediate layer and a recording layer of rare earth-transition metal alloy. A front mask is formed in a low temperature area utilizing a temperature distribution caused in the laser spot by rotating the medium and irradiating laser beam for reproduction, and a rear mask is formed in a high temperature area. In the intermediate temperature area, the direction of magnetization of the recording layer is transferred onto the reproducing layer.

When a magneto-optical output is detected in the magneto-optical disk, a magneto-optical signal cannot be read from the low temperature area and the high temperature area in a laser spot because of the masks formed therein, but can be read from the intermediate temperature area alone. Accordingly, in the magneto-optical disk proposed by the present Applicant, a recording mark can be read with high resolution from an area substantially narrower than a laser spot under application of a magnetic field of several hundreds Oe in the reproduction without using a large initialization magnet.

The magnetic film such as said reproducing layer, intermediate layer and recording layer is formed by sputtering on the basis of the element composition of the rare earth-transition metal alloys that has been set. However, the magnetic characteristics of the magnetic film vary when the type of film-forming apparatus and the condition under which the film is formed vary, even when the element composition of the film to be formed is fixed. This causes the aforementioned problems, impeding production of the magneto-optical disk with good reproducibility that has a desired magnetic characteristics such as jitter required for the product. Furthermore, even when the film is formed using the same apparatus and under the same condition, the film composition may vary because the target in the apparatus is worn out in the course of successive processing of a great number of magneto-optical disks. This hinders the production of the magneto-optical disk with good reproducibility having various characteristics required for a product.

In a currently used magneto-optical disk having a recording capacity of 640 MB on one side, the track pitch is 1.1 $\mu$m, and a minimum mark length of recording marks recorded therein is 0.64 $\mu$m. In order to further increase the recording capacity to about of 1.3 GB, for example, the track pitch should be 0.9 $\mu$m and a minimum recording mark should have a length of 0.38 $\mu$m.

When data of 1.0 GB or more is recorded in and reproduced from the above-mentioned magneto-optical disk capable of MSR reproduction, the track pitch is so narrow that formation of the masks is unstable, and a recording power margin of jitter is reduced depending upon the magnetic characteristics of the recording layer, the intermediate layer and the reproducing layer. Furthermore, although the maximum output of the existing magneto-optical drive is limited to about 300 Oe due to downsizing and power saving, a reproducing magnetic field larger than 300 Oe is required in some cases depending on the magnetic characteristics of the recording layer, the intermediate layer and the reproducing layer. Moreover, when high-density data are repeatedly recorded/reproduced, the quality of reproducing signals is easily degraded and the durability is lowered depending on the magnetic characteristics of the recording layer, the intermediate layer and the reproducing layer.

BRIEF SUMMARY OF THE INVENTION

The present invention was devised to overcome the aforementioned conventional problems. One object of the invention is to provide a magneto-optical recording medium with good reproducibility that has desired magnetic characteristics by specifying the magnetic film not with the element composition but with saturation magnetization.

Another object of the invention is providing a magnetic film having saturation magnetization within a predetermined range or a magnetic film having a Curie temperature within a predetermined range, so as to provide a magneto-optical recording medium capable of magnetically induced super resolution reproduction of data recorded at a high density of 1.0 GB or more on one side of a 3.5-inch disk under an application of a reproducing magnetic field of 300 Oe or less while keeping a recording power margin of jitter at a practical level.

Further object of the invention is providing a magneto-optical recording medium having high durability against repeated recording/reproducing in which data are to be recorded at a high density.

The magneto-optical recording medium of this invention has a magnetic film stack structure at least including a reproducing layer, an intermediate layer and a recording layer. The reproducing layer and the recording layer are magnetic films having an easy magnetization characteristic along the stacking direction, the intermediate layer is a magnetic film having an easy magnetization characteristic along the in-plane direction at room temperature, and the reproducing layer, the intermediate layer and the recording layer have saturation magnetization of 8 emu/cc through 100 emu/cc, 140 emu/cc through 250 emu/cc and 50 emu/cc through 150 emu/cc, respectively at room temperature.

According to the present invention, the ranges of the saturation magnetization of the reproducing layer, the intermediate layer and the recording layer are specified, so that high-density recorded data in the MSR medium can be reproduced by applying a reproducing magnetic field of 300 Oe or less. A front mask formed in a low temperature area in reproducing is concerned with the saturation magnetization of the intermediate layer and the recording layer, and a rear mask formed in a high temperature area is concerned with the saturation magnetization of the reproducing layer. In each of the magnetic films, a value of the saturation magnetization at which both masks of the corresponding areas can be formed under application of a reproducing magnetic field of 300 Oe or less is set as the lower limit. Also, a value of the saturation magnetization at which the reproducing quality cannot be degraded through repeated recording/reproducing is set as the upper limit.

Furthermore, the magnitude of the reproducing magnetic field for forming a front mask in reproducing is concerned with the saturation magnetization of the recording layer. According to the present invention, the range of the saturation magnetization of the recording layer is specified so that a front mask can be formed by applying a small magnetic field. Moreover, since the formation of a front mask largely affects reproduction of a small recording mark, the saturation magnetization of the recording layer is adjusted so as to adjust the magnitude of the reproducing magnetic field used for the MSR reproduction.

In the magneto-optical recording medium of this invention, the reproducing layer, the intermediate layer and the recording layer have Curie temperatures of 240° C. through 350° C., 160° C. through 220° C. and 240° C. through 350° C., respectively.

According to the present invention, the ranges of the Curie temperatures of the reproducing layer, the intermediate layer and the recording layer are specified so that high-density recorded data in the MSR medium can be reproduced by using a currently used magneto-optical drive. The ranges of the Curie temperatures of the respective magnetic layers are determined in consideration of the power limit of a light source including the magneto-optical drive, formation of a double mask under application of a reproducing magnetic field of 300 Oe or less, and obtaining a sufficient reproducing power margin.

In the magneto-optical recording medium of this invention, the reproducing layer and the recording layer are made from rare earth transition metals of GdFeCo and TbFeCo, respectively, and the intermediate layer is made from a rare earth transition metal of GdFeCo including a non-magnetic metal selected from the group consisting of Si, Al and Cr.

Since the non-magnetic metal is added to the intermediate layer in this invention, the Curie temperature of the intermediate layer can be lowered while retaining its other magnetic characteristics.

The magneto-optical recording medium of this invention can further comprise a substrate, a protecting resin layer and a heat conduction layer. And the reproducing layer, the intermediate layer, the recording layer and the heat conduction layer are stacked in this order on the substrate, and respective bare surfaces of the magneto-optical recording medium are covered with the protecting resin layer.

In the magneto-optical recording medium of this invention, data are recorded/reproduced by irradiating the medium through the substrate with a light beam. Therefore, owing to the heat conduction layer, heat can be diffused in the in-plane direction, and the durability of the magneto-optical recording medium can be improved. Furthermore, since the surfaces of the medium are coated with the protecting resin layer such as the UV curing resin layer, the substrate and the magnetic layers can be prevented from being damaged and abraded from outside, resulting in improving the durability.

The magneto-optical recording medium of this invention can further comprise a substrate, a protecting resin layer and a heat conduction layer. And the reproducing layer, the intermediate layer, the recording layer and the heat conduction layer are stacked in this order on the substrate, and respective bare surfaces of the magneto-optical recording medium are covered with the protecting resin layer.

In the present invention, data are recorded/reproduced by irradiating the magneto-optical recording medium through the opposite side of the substrate with a light beam. Therefore, owing to the heat conduction layer, heat can be diffused in the in-plane direction of the medium, and the durability of the magneto-optical recording medium can be improved. Furthermore, since the surfaces of the medium are coated with the protecting resin layer such as the UV curing resin layer, the substrate and the magnetic layers can be prevented from being damaged and abraded from outside, resulting in improving the durability.

In the magneto-optical recording medium of this invention, the heat conduction layer has a thickness of 5 nm through 25 nm.

The thickness of the heat conduction layer of this invention is preferably 5 nm through 25 nm. In the heat conduction film made from, for example, AlTi, when the thickness is smaller than 5 nm, sufficient signal quality cannot be obtained. In the heat conduction film made from AlCr, when the thickness is larger than 25 nm, the recording power sensitivity tends to be degraded.

In the magneto-optical recording medium of this invention, a first dielectric layer with a thickness of 65 nm through 110 nm is formed between the substrate and the reproducing layer, and a second dielectric layer with a thickness of 20 nm through 60 nm is formed between the recording layer and the heat conduction layer.

According to the present invention, the first dielectric film preferably has a thickness of 65 nm through 110 nm, and the second dielectric film preferably has a thickness of 20 nm through 60 nm. In the heat conduction layer made from, for example, AlCr, when the first dielectric film has a thickness smaller than 65 nm, sufficient signal quality cannot be obtained. In the heat conduction made from AlTi, when the first dielectric film has a thickness larger than 110 nm, the recording power sensitivity tends to be degraded. No matter which of AlCr and AlTi is used for the heat conduction layer, when the second dielectric layer has a thickness smaller than 20 nm, sufficient durability against the environment cannot be obtained, and when it has a thickness larger than 60 nm, the recording power sensitivity tends to be degraded.

In the magneto-optical recording medium, each of the magnetic film is formed on a substrate including a land portion and a groove portion, and a recording mark is formed in the land portion.

According to the present invention, a recording mark is formed in the land portion and the groove portion is used for tracking control. In the magneto-optical recording medium of such a land recording system, even when the track pitch is as small as approximately 0.85 µm through 0.9 µm, both a front mask and a rear mask can be formed by applying a small reproducing magnetic field of 300 Oe or less, and high-density recorded data can be reproduced from the MSR medium.

Alternatively, the magneto-optical recording medium of this invention has a magnetic film stack structure at least including a reproducing layer, an intermediate layer and a recording layer, the reproducing layer and the recording layers are magnetic films, being formed on a substrate including a land portion and a groove portion, having an easy magnetization characteristic along the stacking direction, the intermediate layer is a magnetic film having an easy magnetization characteristic along the in-plane direction, the land portion has a width of 0.72 µm through 0.76 µm and is formed at a pitch of approximately 0.9 µm, and the reproducing layer, the intermediate layer and the recording layer have saturation magnetization of 8 emu/cc through 100 emu/cc, 140 emu/cc through 250 emu/cc and 50 emu/cc through 150 emu/cc, respectively at room temperature and a Curie temperature of 240° C. through 350° C., 160° C. through 220° C. and 240° C. through 350° C., respectively.

According to the present invention, the ranges of the saturation magnetization and the Curie temperatures of the reproducing layer, the intermediate layer and the recording layer are specified. Accordingly, a recording mark recorded at such a high density that the land portion with a width of 0.72 µm through 0.76 µm is formed at a pitch of approximately 0.9 µm, namely, at a track pitch of approximately 0.9 µm, can be reproduced while keeping a practical recording power margin of jitter.

The manufacturing method of magneto-optical recording medium of this invention has a magnetic film stack structure comprising the steps of: forming a reproducing layer, on a substrate, which has an easy magnetization characteristic along a stacking direction so as to have saturation magnetization of 8 emu/cc through 100 emu/cc at room temperature; forming an intermediate layer, on the reproducing layer, which has an easy magnetization characteristic along an in-plane direction at room temperature so as to have saturation magnetization of 140 emu/cc through 250 emu/cc at room temperature; and forming a recording layer, on the intermediate layer, which has an easy magnetization characteristic along a stacking direction so as to have saturation magnetization of 50 emu/cc through 150 emu/cc at room temperature.

The manufacturing method of magneto-optical recording medium of this invention has a magnetic film stack structure comprising the steps of: forming a recording layer, on a substrate, which has an easy magnetization characteristic along a stacking direction so as to have saturation magnetization of 50 emu/cc through 150 emu/cc at room temperature; forming an intermediate layer, on the recording layer, which has an easy magnetization characteristic along an in-plane direction at room temperature so as to have saturation magnetization of 140 emu/cc through 250 emu/cc at room temperature; and forming a reproducing layer, on the intermediate layer, which has an easy magnetization characteristic along a stacking direction so as to have saturation magnetization of 8 emu/cc through 100 emu/cc at room temperature.

In the manufacturing method of magneto-optical recording medium of this invention, the reproducing layer is made from a rare earth transition metal of GdFeCo, the recording layer is made from a rare earth transition metal of TbFeCo, and the intermediate layer is made from a rare earth transition metal of GdFeCo including a non-magnetic metal selected from the group consisting of Si, Al and Cr.

In the present invention, since the reproducing layer, the intermediate layer and the recording layer are formed so as to set the saturation magnetization thereof to specific values, a magneto-optical recording medium having desired magnetic characteristics for high-density recording and reproduction can be obtained for sure, and also the Curie temperature of the intermediate layer can be lowered, while keeping the other magnetic characteristics. Moreover, the durability of the magneto-optical recording medium is improved due to the heat conduction layer. And since the both faces of the medium are coated with the protecting resin layer such as the UV curing resin layer, the substrate and the magnetic layers can be prevented from being damaged and abraded from the outside, resulting in improving the durability.

The above and further objects and features of the invention will more fully be apparent from the following detailed description with accompanying drawings.

DETAILED DESCRIPTION OF THE INVENTION

Now, the present invention will be described in detail on the basis of drawings illustrating preferred embodiments thereof.

Figure 1:
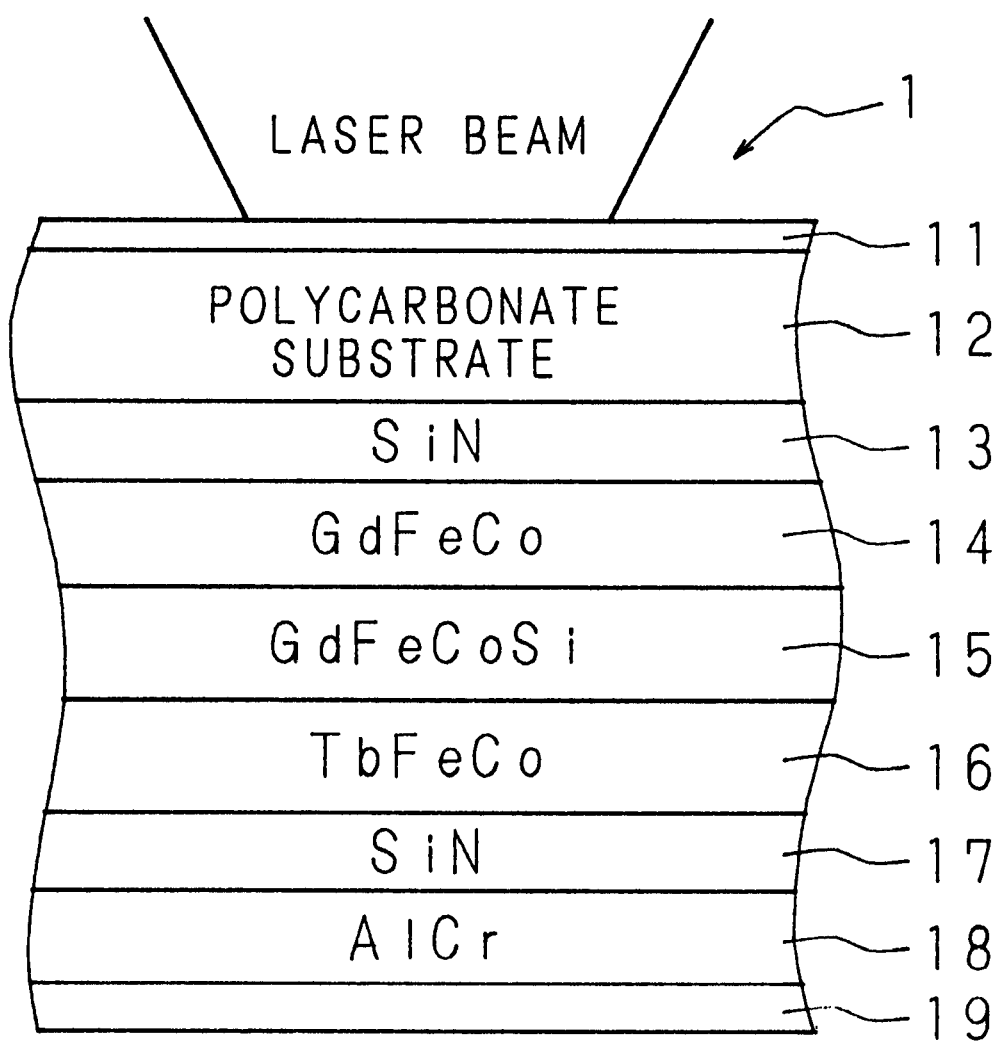
FIG. 1 is a sectional view for showing a film structure of a magneto-optical disk of the present invention.

Embodiment 1:

FIG. 1 is a sectional view for showing the film structure of a magneto-optical disk according to the invention. The magneto-optical disk 1 includes a lower dielectric layer 13 of SiN, a reproducing layer 14 of GdFeCo, an intermediate layer 15 of GdFeCoSi, a recording layer 16 of TbFeCo, an upper dielectric layer 17 of SiN, and a heat conduction layer 18 of AlCr stacked in this order on a substrate 12 of polycarbonate. The outermost layers of the both faces of the magneto-optical disk 1, that is, the bare surfaces of the substrate 12 and the heat conduction layer 18 are coated with UV curing films 11 and 19, respectively.

The substrate 12 is a land substrate having a groove for tracking, and has a diameter of 3.5 inches and a thickness of 1.2 mm. The depth of the groove is 67 nm, a land portion is formed with a track pitch of 0.9 $\mu$m, and the width of the land portion is 0.73 $\mu$m. At this point, the depth of the groove is given as $\lambda/(6.5\,n)$ nm, wherein X is a wavelength of a laser beam and is specifically 685 nm; n indicates a refractive index of the substrate; and n=1.58. The width of the land portion is given as a half bandwidth of the depth of the groove.

The reproducing layer 14 is a film of $Gd_{24.6}Fe_{61.8}Co_{13.6}$ with a thickness of 41 nm, in which magnetization of the transition metal is dominant (which state is hereinafter designated as TM rich), having an axis of easy magnetization in a perpendicular direction namely the stacking direction. And the reproducing layer 14 has saturation magnetization lower than 100 emu/cc at room temperature (10° C. through 35° C.), which increases as the temperature increases up to approximately 170° C. The reproducing layer 14 has a Curie temperature of substantially 270° C. and a coercive force smaller than 1.5 kOe at room temperature.

The intermediate layer 15 is a film of $(Gd_{33.8}Fe_{62.4}Co_{3.8})_{92}Si_8$ with a thickness of 41 nm, in which magnetization of the rare earth is dominant (which state is hereinafter designated as RE rich), which has no compensation temperature up to the Curie temperature, having the axis of easy magnetization in an in-plane direction at room temperature (10° C. through 35° C.). When the temperature becomes and exceeds the predetermined temperature, namely the room temperature, the axis of easy magnetization changes from the in-plane direction to the perpendicular direction. The intermediate layer 15 has saturation magnetization lower than 250 emu/cc at room temperature, which simply decreases as the temperature increases up to a Curie temperature of approximately 180° C. The intermediate layer 15 includes Si, that is, a non-magnetic element, in order to set the Curie temperature low. The intermediate layer 15 can include another element such as Al and Cr instead of Si.

The recording layer 16 is a film of $Tb_{22.2}Fe_{60.3}Co_{17.5}$ with a thickness of 50 nm, being TM rich and having the axis of easy magnetization in the perpendicular direction. The recording layer has saturation magnetization lower than 150 emu/cc at room temperature, which increases as the temperature increases up to approximately 150° C. The recording layer 16 has a Curie temperature of substantially 270° C. and a coercive force larger than 10 kOe at room temperature. When Curie temperatures of the reproducing layer 14, the intermediate layer 15 and the recording layer 16 are indicated as Tc1, Tc2 and Tc3, respectively, there is a relationship of Tc2<Tc1 and Tc2<Tc3 among them. Also, when the coercive forces at room temperature of the reproducing layer 14 and the recording layer 16 are indicated as Hc1 and Hc3, respectively, there is a relationship of Hc3>Hc1 between them.

The lower dielectric layer 13 has a thickness of 70 nm, the upper dielectric layer has a thickness of 25 nm, and the heat conduction layer 18 has a thickness of 15 nm. These stacked films are successively formed by DC sputtering under conditions as listed in Table 1 below. The film-forming apparatus and the condition under which the films are formed are set beforehand so that the reproducing layer 14, the intermediate layer 15 and the recording layer 16 have the aforementioned values of saturation magnetization. Moreover, the life of a target is also tested beforehand and set so that the magnetic films having the above saturation magnetization values can be formed for sure.

Figure 2:
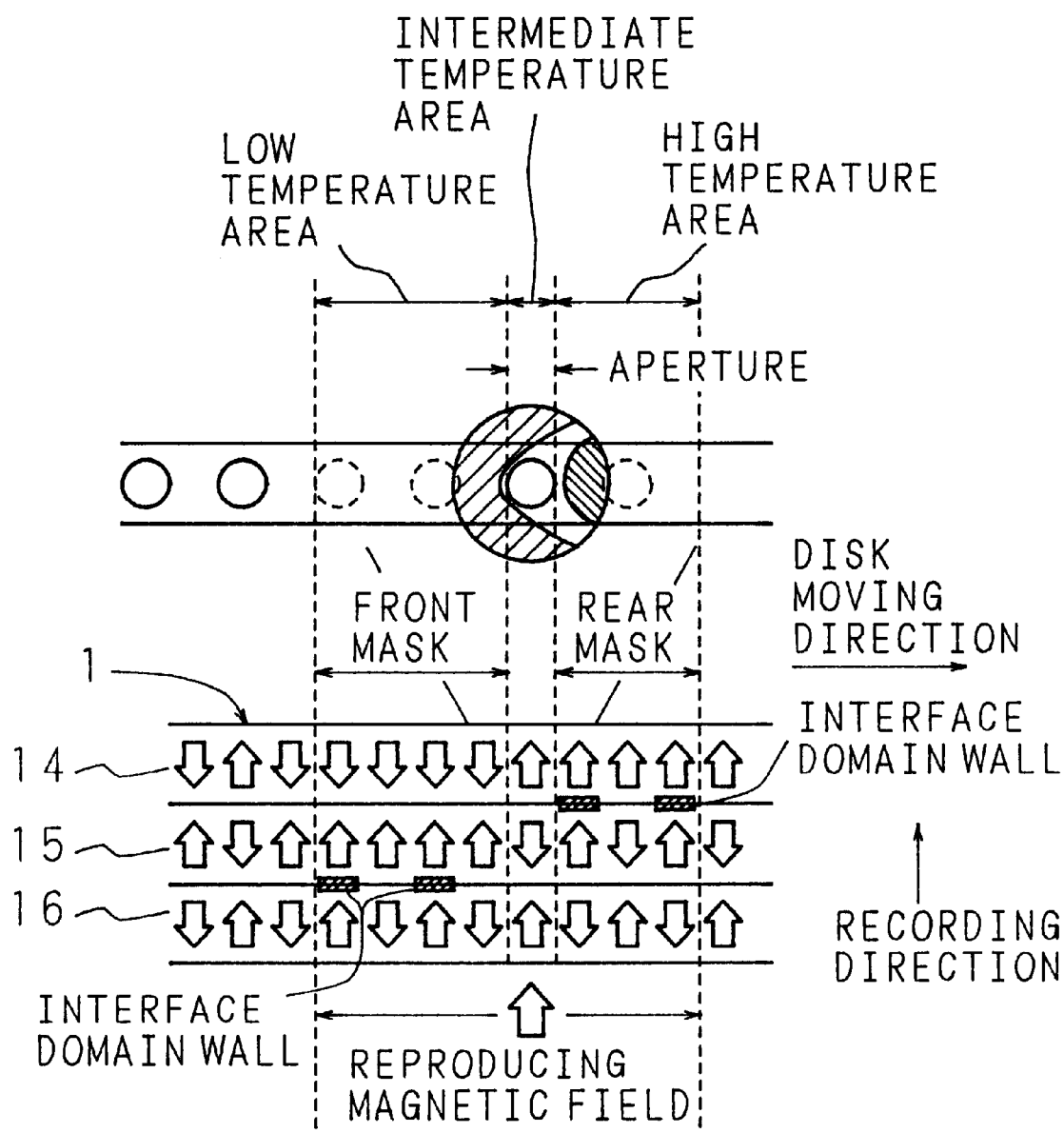
FIG. 2 is a diagram for showing a film structure of a magneto-optical disk according to the invention and a magnetization state attained therein in reproduction.

In the magneto-optical disk having the aforementioned film structure, random data with a minimum mark length of 0.38 $\mu$m are recorded through optical modulation recording and reproduced at a linear rate of 7.5 m/s for evaluation. In the reproduction, a reproducing magnetic field of 300 Oe is applied in the same direction as in recording the recording marks. The reproducing laser beam is applied through the substrate 12 of the magneto-optical disk 1. FIG. 2 is a diagram for showing a film structure of the magneto-optical disk in FIG. 1 and a magnetization state attained therein in reproduction. The drawing shows only the reproducing layer, the intermediate layer and the recording layer, omitting the other film layers. As shown in FIG. 2, temperature distribution is caused in the magnetic layer when the magneto-optical disk is rotated and the magnetic layer is irradiated with the reproducing laser beam. In a low temperature area, when the reproducing magnetic field is larger than an exchange coupled force working between the intermediate layer 15 and the recording layer 16, the magnetization direction of the intermediate layer 15 becomes accordant with the direction of the reproducing magnetic field. The magnetization direction of the reproducing layer 14 exchanged coupled with the intermediate layer 15 becomes accordant with the reverse direction to the reproducing magnetic field regardless of the recording mark, resulting in forming a front mask. In a high temperature area, the exchange coupled force working between the reproducing layer 14 and the intermediate layer 15 is cut off, and the magnetization direction of the reproducing layer 31 becomes accordant with the direction of the reproducing magnetic field, resulting in forming a rear mask. In an intermediate temperature area, an exchange coupled force larger than the reproducing magnetic field works between the reproducing layer 14, the intermediate layer 15 and the recording layer 16. Accordingly, the magnetization direction of the recording layer 16 is transferred onto the reproducing layer 14.

When a magneto-optical output is detected in the magneto-optical disk 1, a magneto-optical signal cannot be read from the low temperature area and the high temperature area in a laser spot because of the masks formed therein, but can be read from the intermediate temperature area alone.

Figure 3:
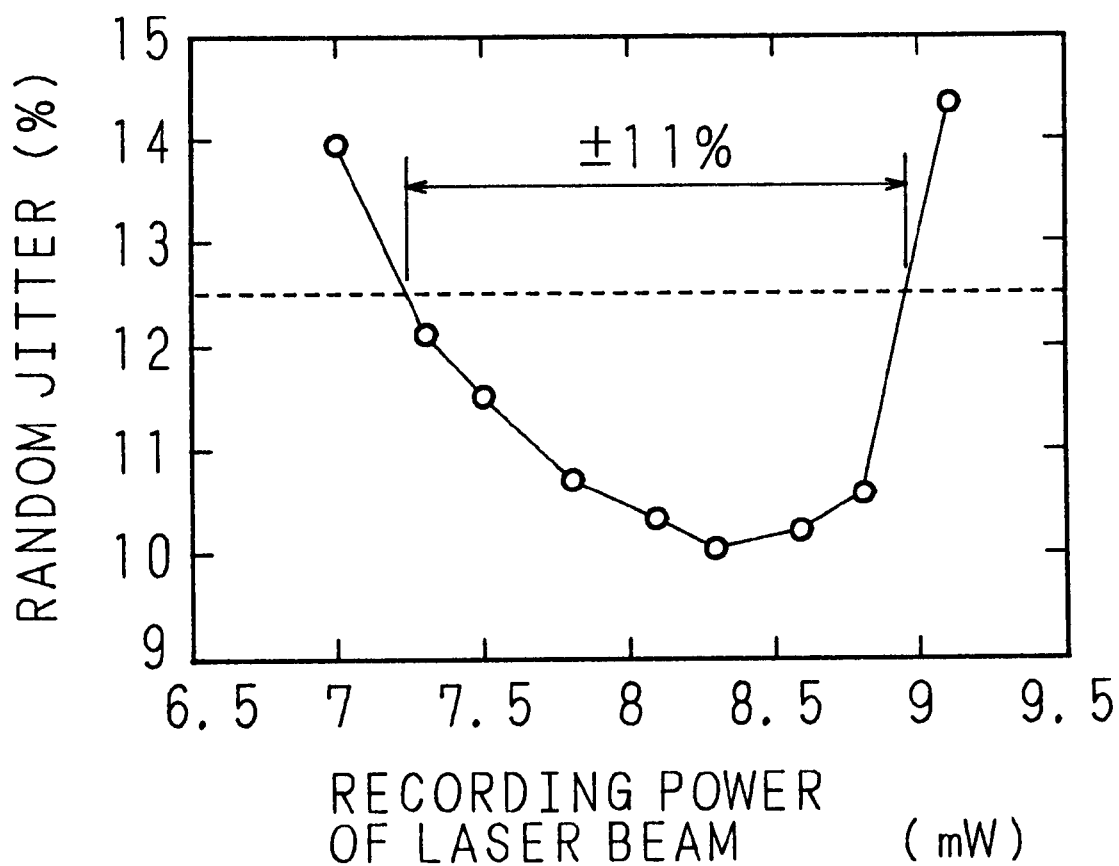
FIG. 3 is a graph for showing a recording power margin of jitter in the magneto-optical disk according to Embodiment 1 of the invention.

FIG. 3 is a graph for showing a recording power margin of jitter of the magneto-optical disk 1. The ordinate indicates random jitter and the abscissa indicates the recording power of a laser beam. In practical use, random jitter is preferably 12.5% or less. It is understood from the graph that the recording power margin of jitter of the magneto-optical disk 1 is ±11%, which is sufficiently practical.

In this manner, the track pitch is 0.9 µm and the minimum recording mark length is 0.38 µm in the magneto-optical disk 1 of Embodiment 1. Therefore, a magneto-optical disk for high-density recording with a recording capacity of 1.3 GB can be reproduced with a sufficient recording power margin of jitter.

Figure 4:
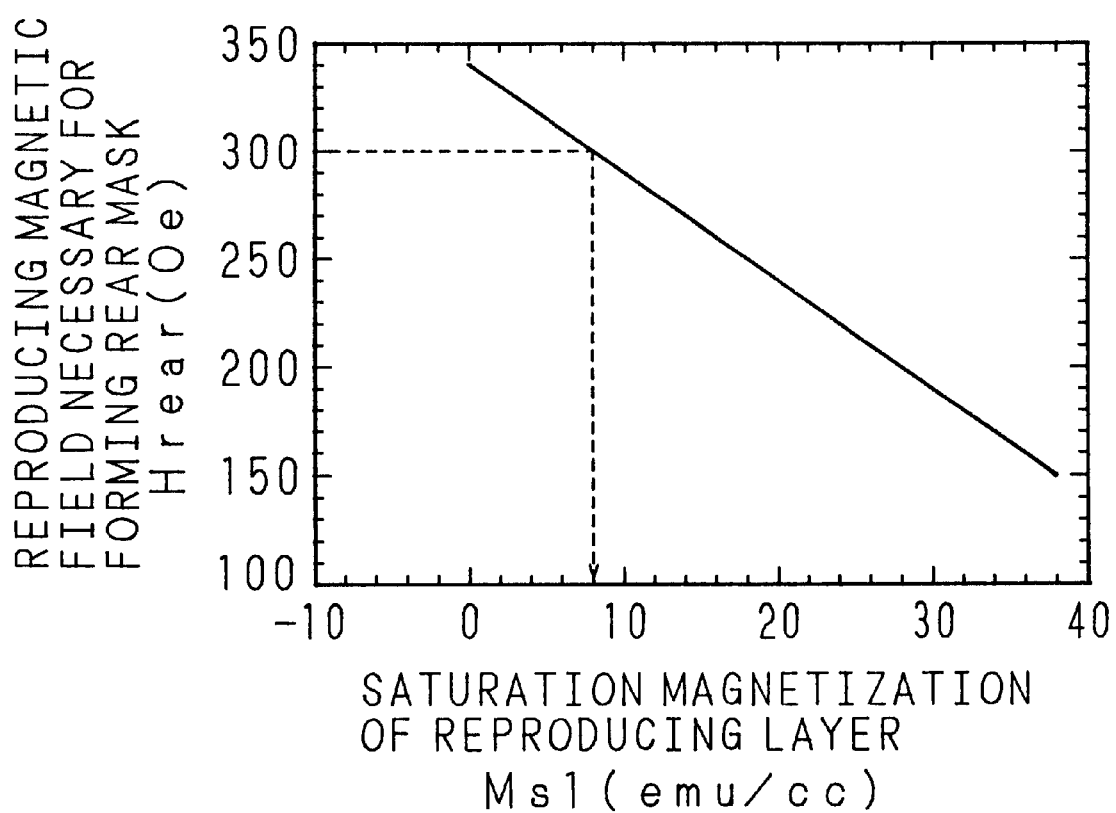
FIG. 4 is a graph for showing the relationship between saturation magnetization of a reproducing layer and a reproducing magnetic field necessary for forming a mask for the invention.

In the magneto-optical disk having the aforementioned film structure, the magnetic characteristics of the magnetic films usable for attaining MSR reproduction of high-density recorded data are examined. First, the ranges of saturation magnetization of the magnetic layers applicable to reproduction by applying a reproducing magnetic field of 300 Oe are checked. FIG. 4 is a graph for showing change of a reproducing magnetic field necessary for forming a rear mask in accordance with the composition of the reproducing layer. The ordinate indicates the reproducing magnetic field Hrear necessary for forming the rear mask, and the abscissa indicates the saturation magnetization Ms1 of the reproducing layer. It is understood from the graph that the saturation magnetization Ms1 of the reproducing layer 14 should be 8 emu/cc or more in order to reproduce data by applying a magnetic field of 300 Oe or less.

Figure 5:
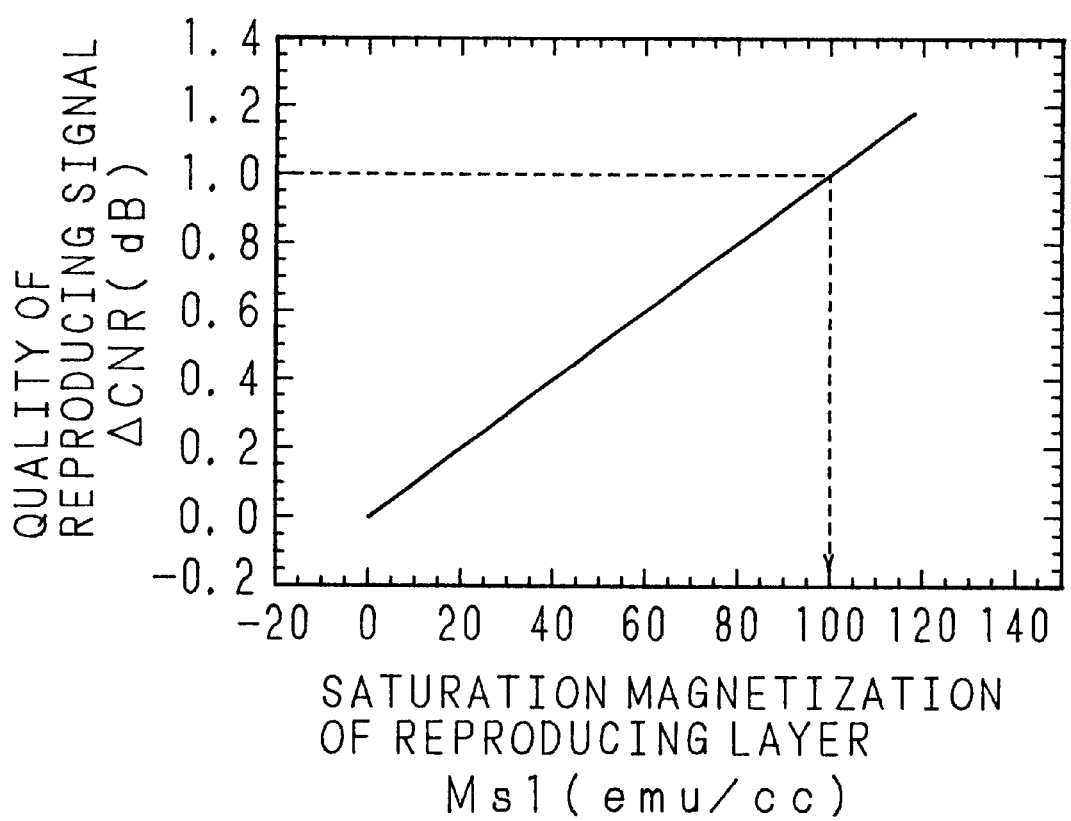
FIG. 5 is a graph for showing the relationship between the saturation magnetization of the reproducing layer and quality of a reproducing signal for the invention.

As the saturation magnetization of the reproducing layer 14 is larger, the quality of a reproducing signal is more largely degraded. FIG. 5 is a graph for showing the relationship between the saturation magnetization of the reproducing layer and the quality of a reproducing signal. The ordinate indicates ΔCNR, that is, a difference from reference CNR, and the abscissa indicates the saturation magnetization Ms1 of the reproducing layer. ΔCNR is obtained by measuring degree of degradation of signal quality resulting from 100,000 repeated erasing with erasing power larger than optimal recording power by approximately 13%. It is understood from the graph that the saturation magnetization Ms1 of the reproducing layer 14 is 100 emu/cc or less when ΔCNR is in an allowable range, namely, smaller than 1 dB.

Figure 6:
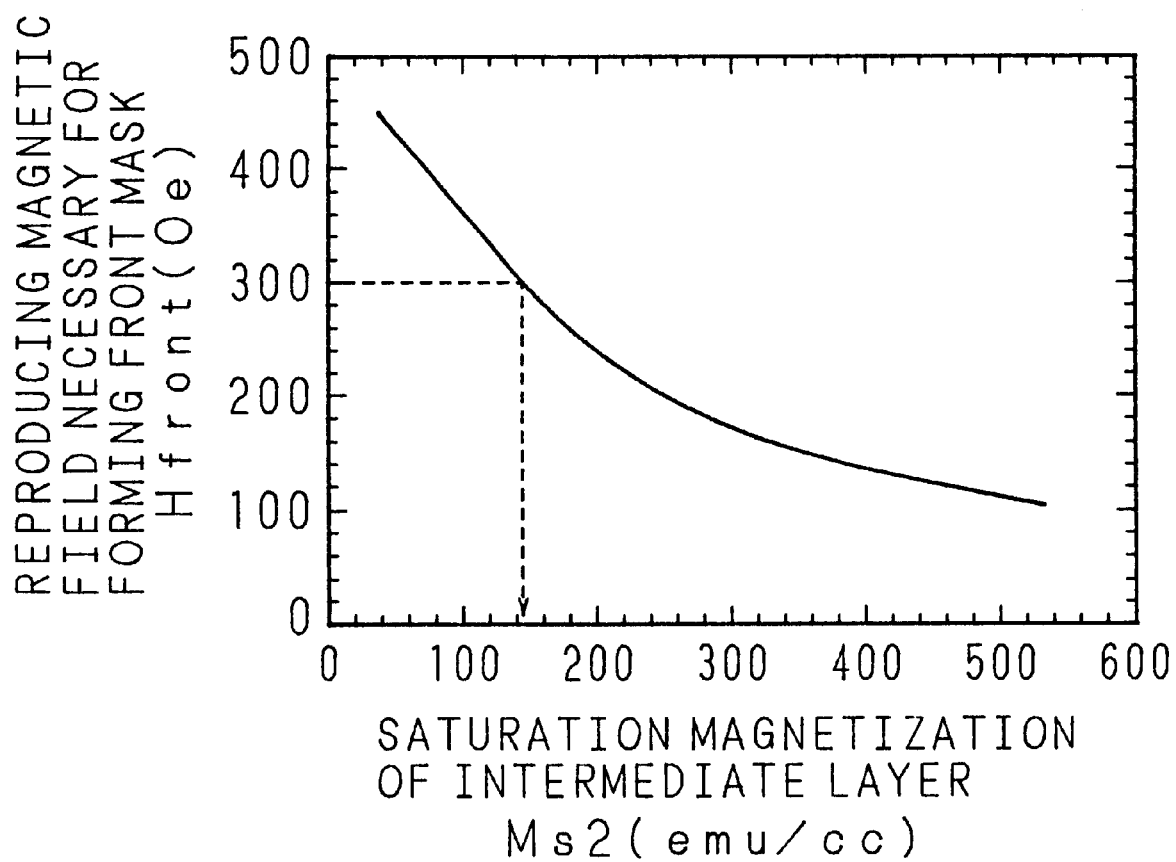
FIG. 6 is a graph for showing the relationship between saturation magnetization of an intermediate layer and a reproducing magnetic field necessary for forming a mask for the invention.
Figure 7:
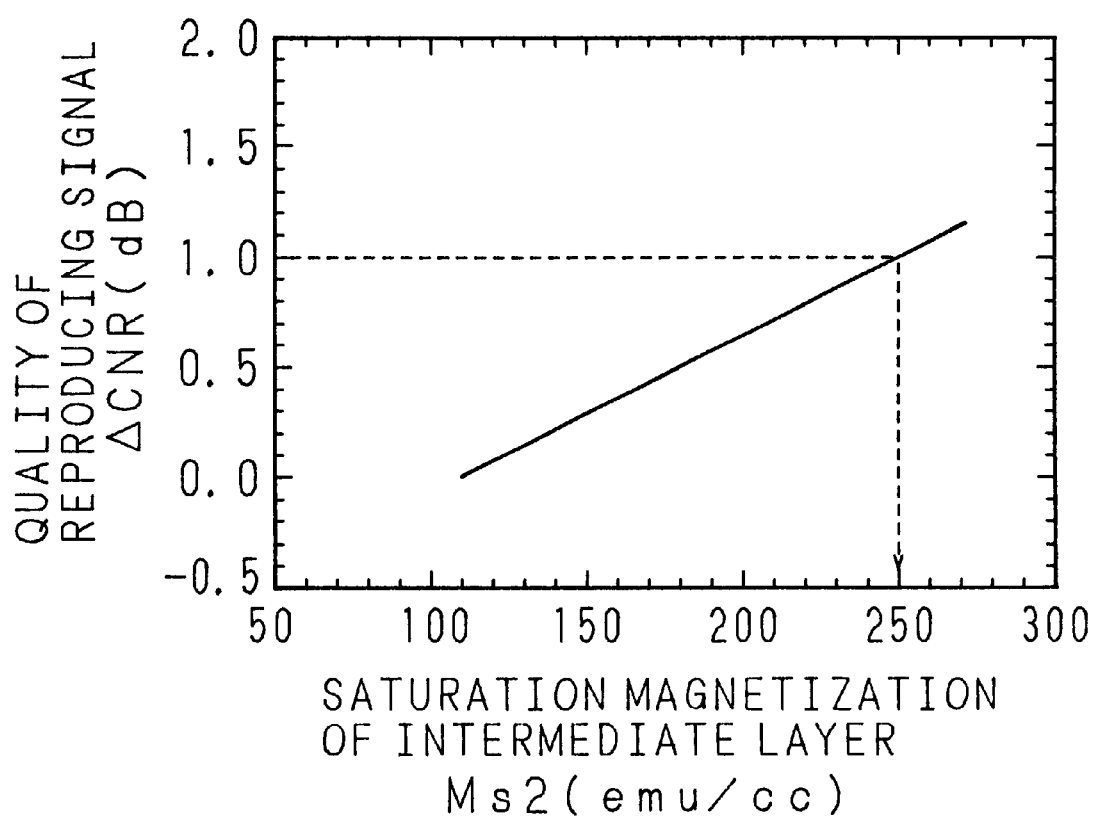
FIG. 7 is a graph for showing the relationship between the saturation magnetization of the intermediate layer and quality of a reproducing signal for the invention.

FIG. 6 is a graph for showing change of a reproducing magnetic field necessary for forming a front mask in accordance with the composition of the intermediate layer. The ordinate indicates the reproducing magnetic field Hfront necessary for forming the front mask, and the abscissa indicates the saturation magnetization Ms2 of the intermediate layer. It is understood from the graph that the saturation magnetization Ms2 of the intermediate layer 15 should be 140 emu/cc or more in order to reproduce data by applying a magnetic field of 300 Oe or less. FIG. 7 is a graph for showing the relationship between the saturation magnetization of the intermediate layer and the quality of a reproducing signal. The ordinate indicates ΔCNR, that is, a difference from reference CNR, and the abscissa indicates the saturation magnetization Ms2 of the intermediate layer. ΔCNR is obtained by measuring degree of degradation of the signal quality resulting from 100,000 repeated erasing with erasing power larger than optimal recording power by approximately 13%. It is understood from the graph that the saturation magnetization Ms2 of the intermediate layer 15 is 250 emu/cc or less when ΔCNR is in an allowable range, namely, smaller than 1 dB.

Figure 8:
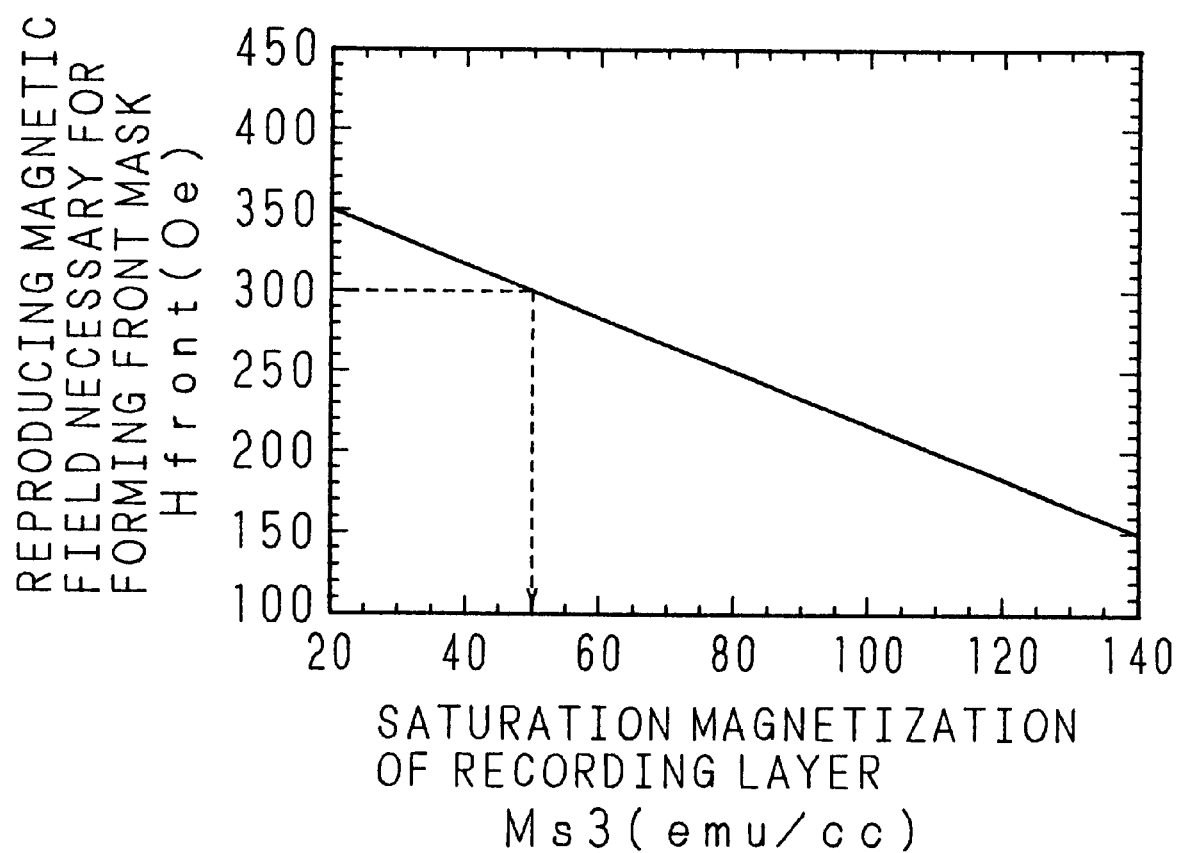
FIG. 8 is a graph for showing the relationship between saturation magnetization of a recording layer and a reproducing magnetic field necessary for forming a mask for the invention.
Figure 9:
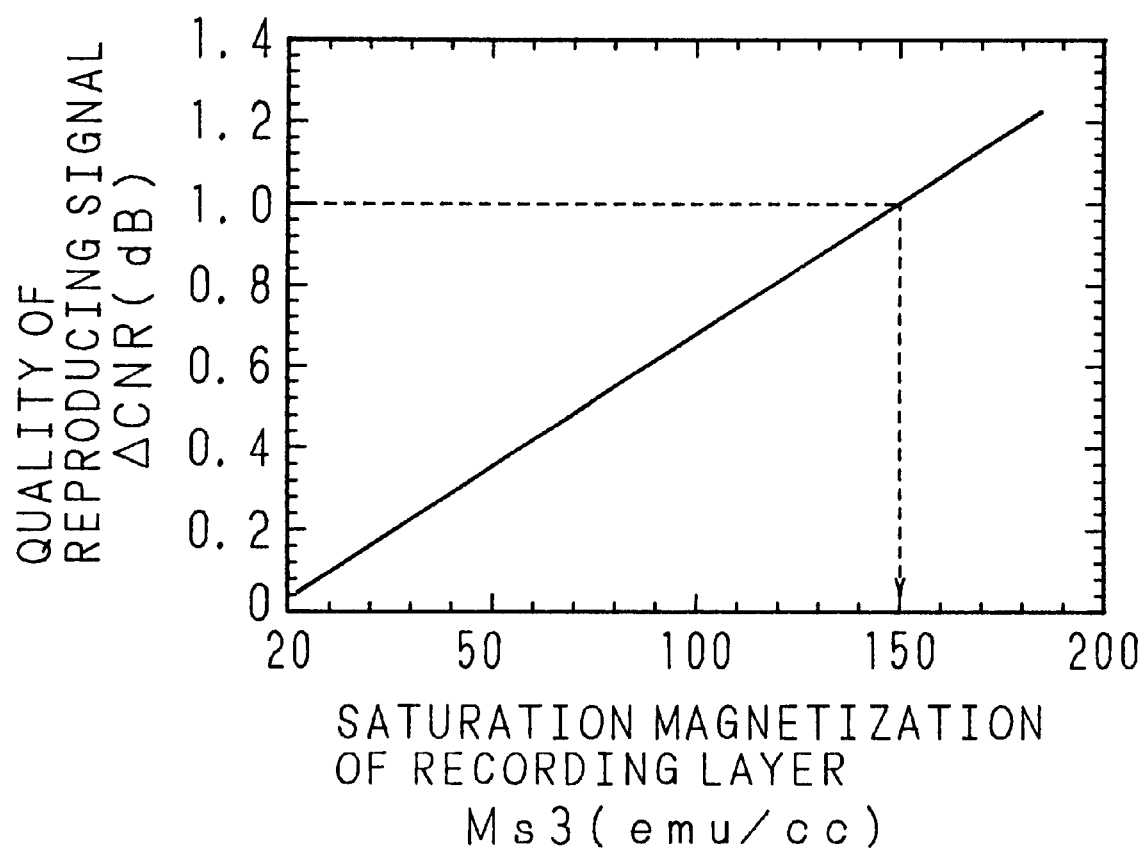
FIG. 9 is a graph for showing the relationship between the saturation magnetization of the recording layer and quality of a reproducing signal for the invention.

FIG. 8 is a graph for showing change of the magnetic field necessary for forming the front mask in accordance with the composition of the recording layer. The ordinate indicates the reproducing magnetic field Hfront necessary for forming the front mask, and the abscissa indicates the saturation magnetization Ms3 of the recording layer. It is understood from the graph that the saturation magnetization Ms3 of the recording layer 16 should be 50 emu/cc or more in order to reproduce data by applying a magnetic field of 300 Oe or less. FIG. 9 is a graph for showing the relationship between the saturation magnetization of the recording layer and the quality of a reproducing signal. The ordinate indicates ΔCRN, that is, a difference from reference CNR, and the abscissa indicates the saturation magnetization Ms3 of the recording layer. ΔCNR is obtained by measuring degree of degradation of the signal quality resulting from 100,000 repeated erasing with erasing power larger than optimal recording power by approximately 13%. It is understood from the graph that the saturation magnetization Ms3 of the recording layer 16 is 150 emu/cc or less when ΔCNR is in an allowable range, namely, smaller than 1 dB.

On the basis of the aforementioned examination, in order to reproduce data from the magneto-optical disk having a recording capacity of approximately 1.3 GB by applying a reproducing magnetic field of 300 Oe or less, the ranges of the saturation magnetization are between 8 emu/cc and 100 emu/cc in the reproducing layer 14, between 140 emu/cc and 250 emu/cc in the intermediate layer 15 and between 50 emu/cc and 150 emu/cc in the recording layer 16. In the magneto-optical disk 1 of Embodiment 1, these conditions are satisfied.

Figure 10:
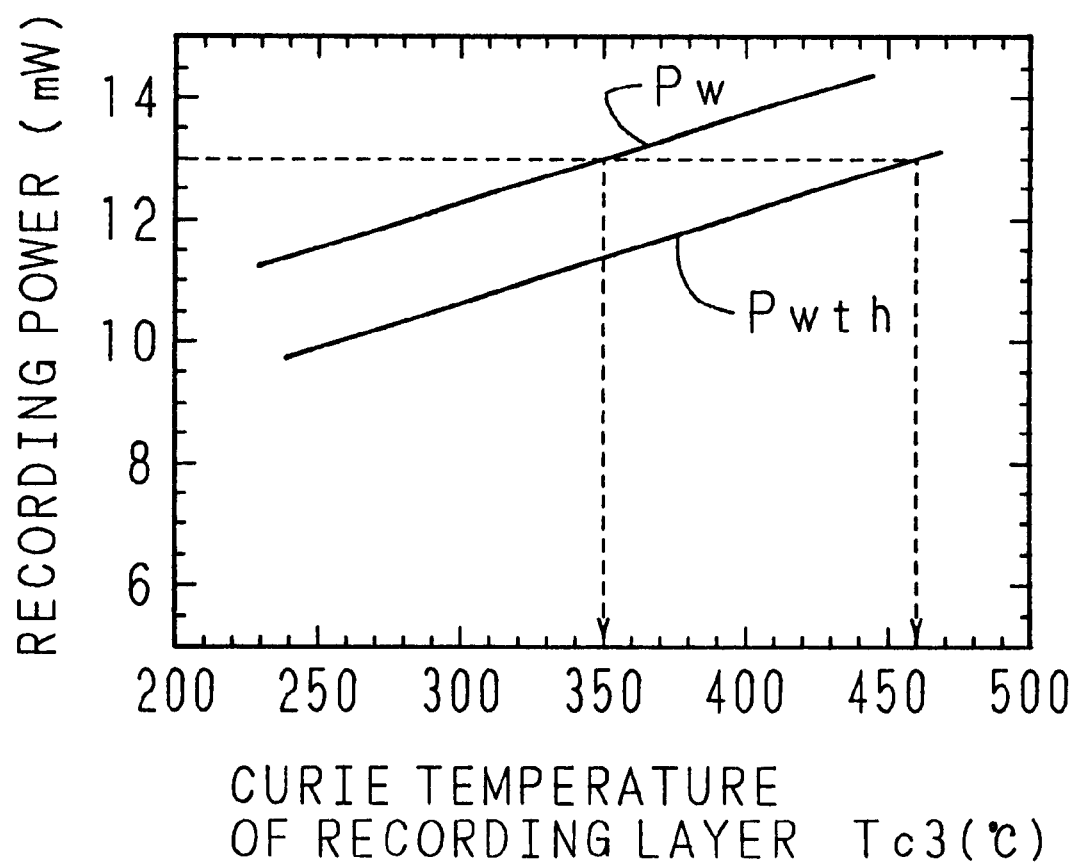
FIG. 10 is a graph for showing the relationship between the Curie temperature of the recording layer and recording power for the invention.
Figure 11:
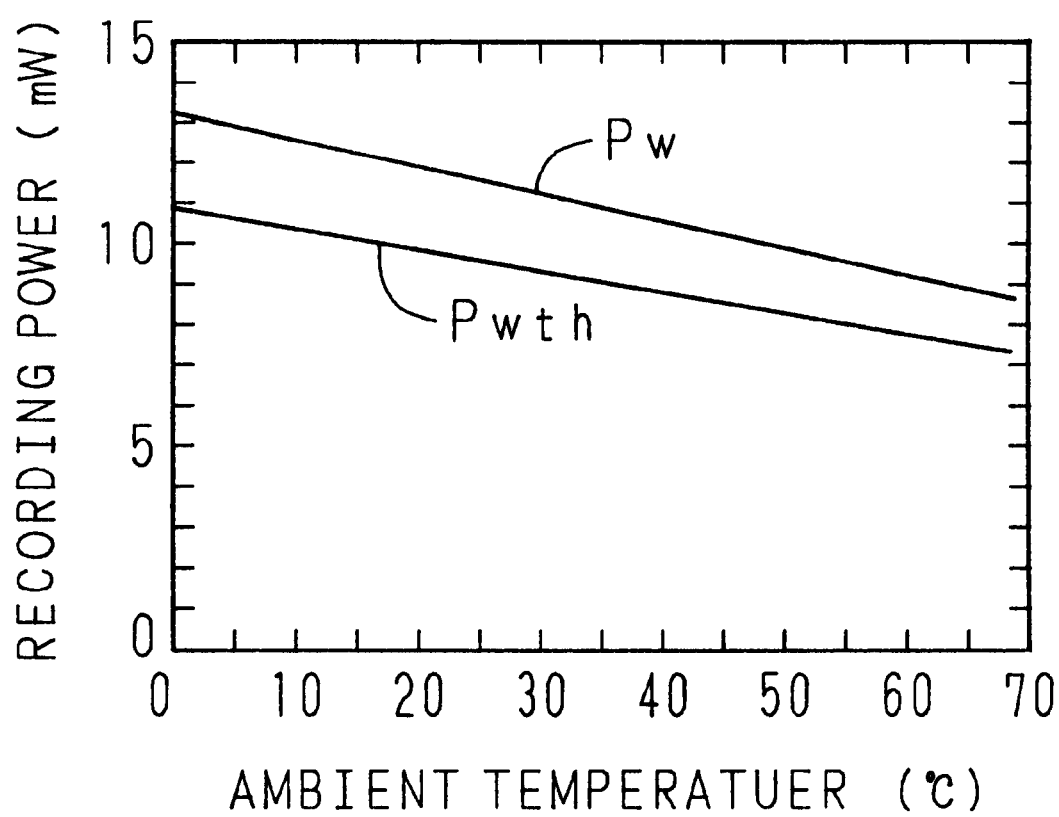
FIG. 11 is a graph for showing the relationship between an ambient temperature of the magneto-optical disk and the recording power for the invention.

Next, the ranges of the Curie temperatures of the magnetic layers reproducible by using a currently used magneto-optical drive are examined. FIG. 10 is a graph for showing the sensitivity of recording power changed against the Curie temperature of the recording layer at room temperature, wherein values obtained in the outermost peripheral portion of a 3.5-inch disk are shown. The ordinate indicates the recording power of the laser beam, and the abscissa indicates the Curie temperature Tc3 of the recording layer 16. As the sensitivity of the recording power, both power Pwth at which a signal starts to appear and power Pw at which a signal can be sufficiently obtained are shown. FIG. 11 is a graph for showing the relationship between the ambient temperature and the recording power in the magneto-optical disk. The ordinate indicates the recording power, and the abscissa indicates the ambient temperature, and values obtained at a linear rate of 12.6 m/s are shown. It is understood from FIG.

11 that higher recording power is necessary as the ambient temperature is higher.

As is shown in FIG. 10, when the power limit of a laser diode of the magneto-optical drive is approximately 13 mW, the Curie temperature Tc3 can be as high as 450° C. with respect to the recording power Pwth. However, since a recording power for sufficiently obtaining a signal is actually used and higher recording power is required for guaranteeing the operation down to the ambient temperature of 0° C., the upper limit of the Curie temperature Tc3 of the recording layer 16 is 350° C.

Figure 12:
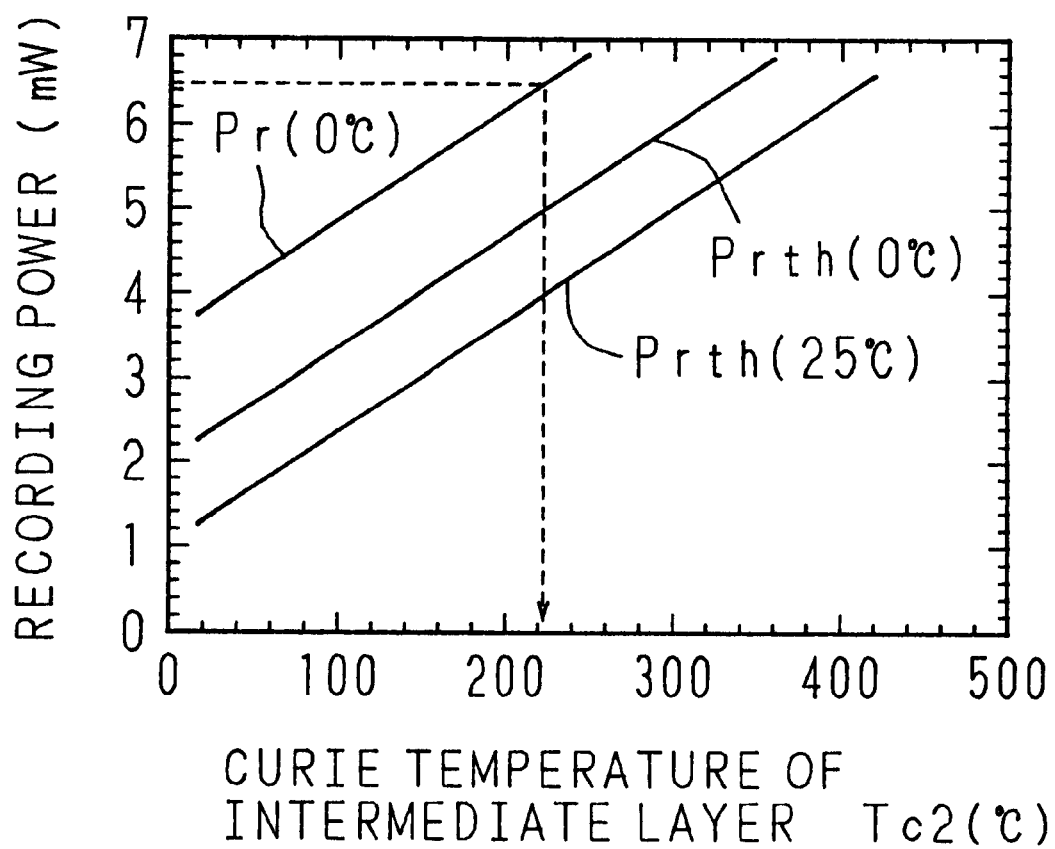
FIG. 12 is a graph for showing the relationship between the Curie temperature of the intermediate layer and the reproducing power for the invention.

FIG. 12 is a graph for showing the sensitivity of reproducing power changed in accordance with the Curie temperature of the intermediate layer. The ordinate indicates the reproducing power of a laser beam, and the abscissa indicates the Curie temperature Tc2 of the intermediate layer 15. As the sensitivity of the reproducing power, power Prth at which a signal starts to appear at the ambient temperatures of 0° C. and 25° C. and power Pr at which a signal can be sufficiently obtained at 0° C. are shown. As is understood from the graph, higher reproducing power is required at 0° C. than at 25° C. The reproducing power Pr at which a signal can be sufficiently obtained has larger values. When the limit of high-frequency superposition is 6.4 mW, the upper limit of the Curie temperature Tc2 of the intermediate layer 15 is 220° C.

Figure 13:
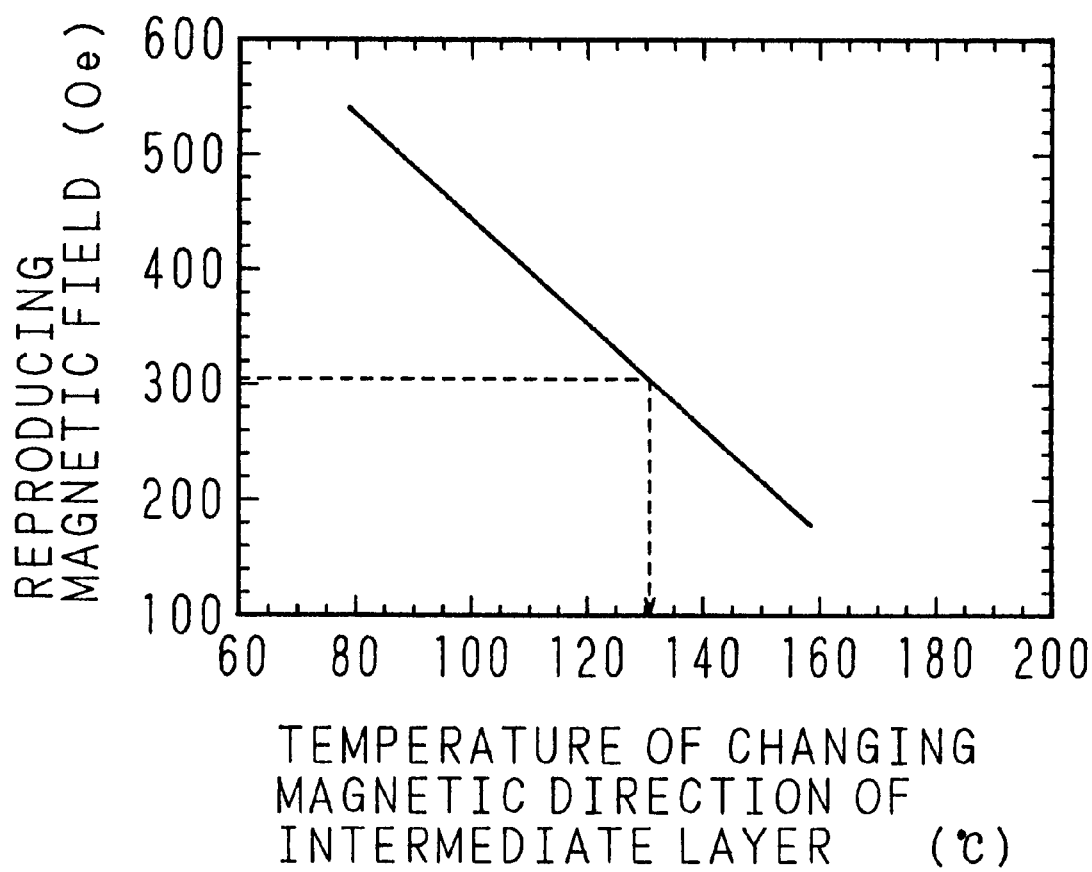
FIG. 13 is a graph for showing the relationship between the axis of easy magnetization of the intermediate layer and a reproducing magnetic field for the invention.
Figure 14:
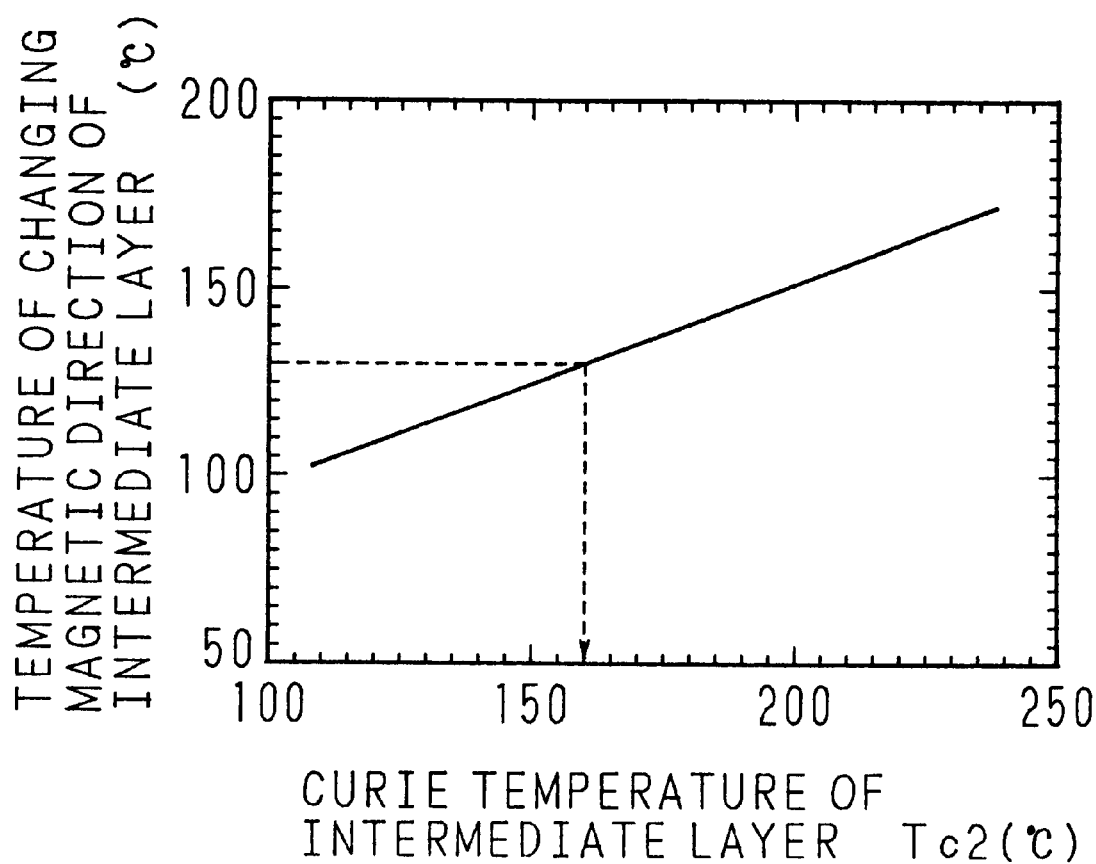
FIG. 14 is a graph for showing the relationship between the Curie temperature and the axis of easy magnetization of the intermediate layer for the invention.

FIG. 13 is a graph for showing the relationship between the characteristic of the axis of easy magnetization of the intermediate layer and the reproducing magnetic field. The ordinate indicates the reproducing magnetic field, and the abscissa indicates the temperature at which the magnetization of the intermediate layer 15 is changed from in-plane magnetization to perpendicular magnetization. As is understood from the graph, as the temperature at which the magnetization of the intermediate layer is changed to the perpendicular magnetization is higher, the reproducing magnetic field has a smaller value. In order to reproduce data by using a reproducing magnetic field of 300 Oe or less, the temperature at which the magnetization is changed to the perpendicular magnetization is required to be 130° C. or more. Furthermore, FIG. 14 is a graph for showing the relationship between the Curie temperature and the characteristic of the axis of easy magnetization of the intermediate layer. The ordinate indicates the temperature at which the magnetization of the intermediate layer 15 is changed from the in-plane magnetization to the perpendicular magnetization, and the abscissa indicates the Curie temperature Tc2 of the intermediate layer 15. It is understood from the graph that the intermediate layer 15 in which the magnetization is changed to the perpendicular magnetization at 130° C. or more has the Curie temperature Tc2 of 160° C. or more.

Figure 15:
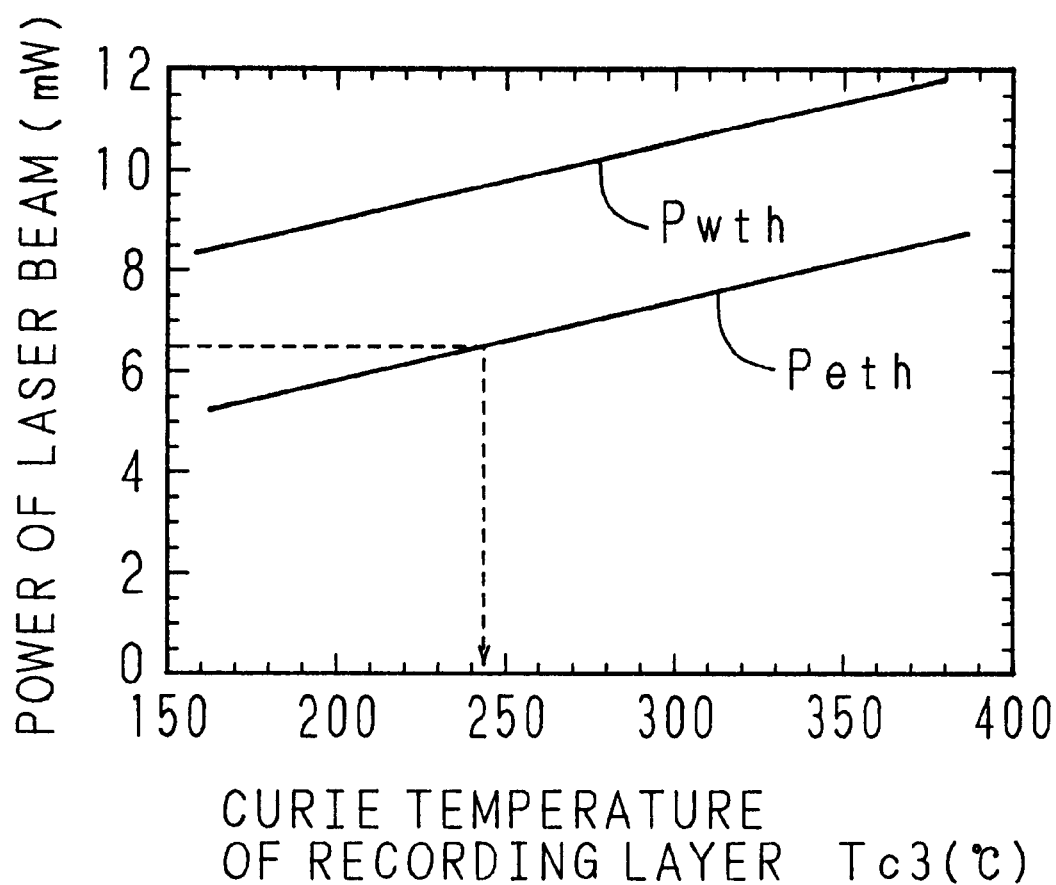
FIG. 15 is a graph for showing the relationship between the Curie temperature of the recording layer and the power of a laser beam for the invention.

When the Curie temperature Tc2 of the intermediate layer 15 is 160° C. or more, the reproducing power Prth is approximately 4.1 mW or more as is shown in FIG. 12. In order to secure a sufficient reproducing power margin of approximately ±20% between appearance and start of erase of a reproducing signal, when the reproducing signal is assumed to appear at 4.1 mW, reproducing power Peth at which the reproducing signal starts to erase is 6.2 mW. FIG. 15 is a graph for showing the relationship between the Curie temperature of the recording layer and the power of a laser beam. The ordinate indicates the power of the laser beam, and the abscissa indicates the Curie temperature Tc3 of the recording layer 16. It is understood from the graph that when the reproducing power Peth is 6.2 mW or more, the Curie temperature of the recording layer 16 is required to be 240° C. or more.

Since the reproducing layer 14 is required to reproduce a recording mark formed in the recording layer 16, the range of the Curie temperature Tc1 of the reproducing layer 14 is the same as that of the recording layer 16 and is specifically between 240° C. and 350° C.

Accordingly, in order to reproduce data from the magneto-optical disk having a recording capacity of approximately 1.3 GB by using a currently used magneto-optical drive, the ranges of the Curie temperatures are between 240° C. and 350° C. in the reproducing layer 14, between 160° C. and 220° C. in the intermediate layer 15, and between 240° C. and 350° C. in the recording layer 16. In the aforementioned magneto-optical disk 1 of Embodiment 1, these conditions are satisfied.

Figure 16:
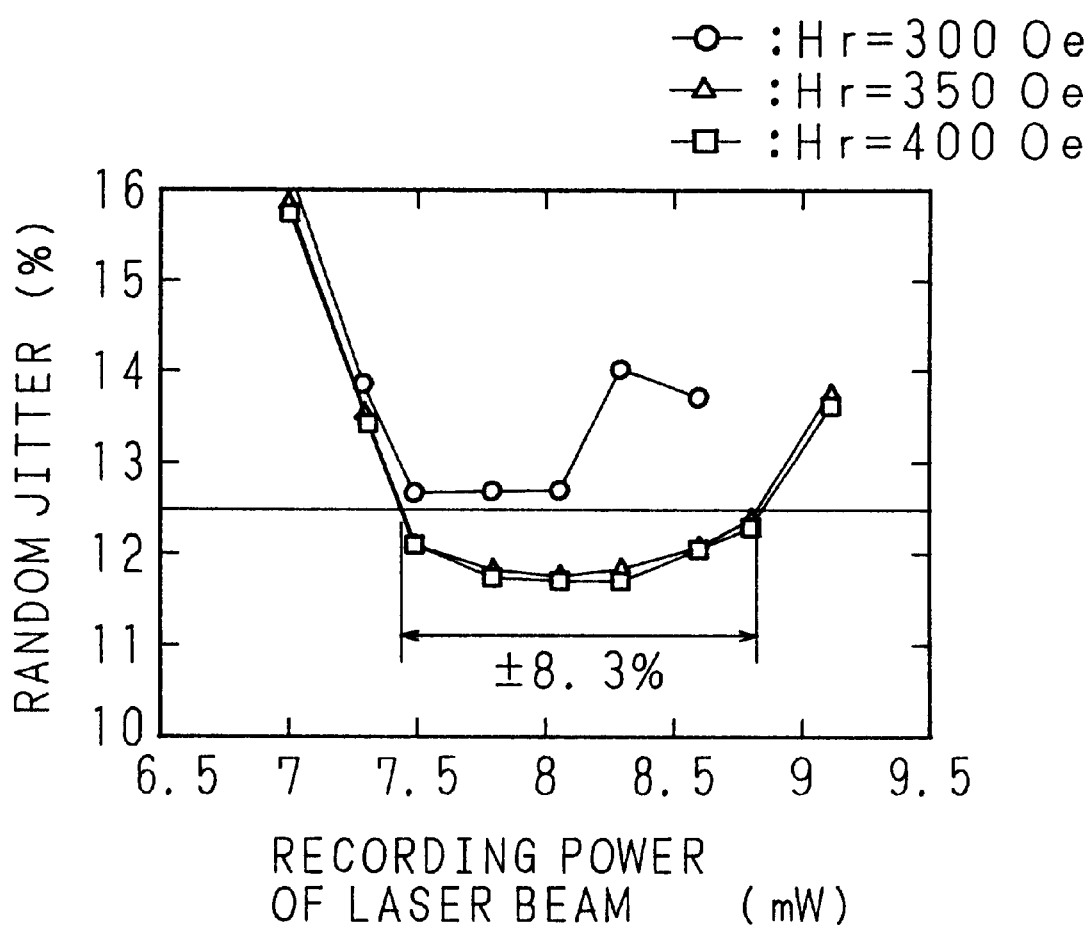
FIG. 16 is a graph for showing a recording power margin of jitter and a necessary reproducing magnetic field in a comparative example.

With regard to a magneto-optical disk of a comparative example including magnetic layers whose saturation magnetization and Curie temperatures are out of the aforementioned ranges, a recording mark formed in the same manner as in Embodiment 1 is reproduced for evaluation. In this magneto-optical disk, a substrate is the same as that of Embodiment 1, a reproducing layer 14 and a recording layer 16 have compensation compositions, namely, have spontaneous magnetization Ms of substantially 0, and an intermediate layer 15 has a Curie temperature Tc2 of 150° C. FIG. 16 is a graph for showing the recording power margin of jitter and the necessary reproducing magnetic field of the magneto-optical disk of the comparative example. The ordinate indicates the random jitter, and the abscissa indicates the recording power of a laser beam. In this graph, the result obtained by a reproducing magnetic field of 300 Oe is shown with a mark "○", the result obtained by a reproducing magnetic field of 350 Oe is shown with a mark "Δ", and the result obtained by a reproducing magnetic field of 400 Oe is shown with a mark "✕".

The magneto-optical disk of the comparative example has high durability in repeated continuous erasing, and the signal quality is hardly degraded through 100,000 erasing. However, as compared with the magneto-optical disk of Embodiment 1 (shown in FIG. 3), bottom jitter is larger. Furthermore, the recording power margin for attaining random jitter of 12.5% or less is ±8.3%, which is narrower than that of the magneto-optical disk 1 of Embodiment 1. Moreover, the recording mark cannot be reproduced by applying a reproducing magnetic field of 300 Oe but a reproducing magnetic field of 350 Oe or more is required for the reproduction.

Figure 17:
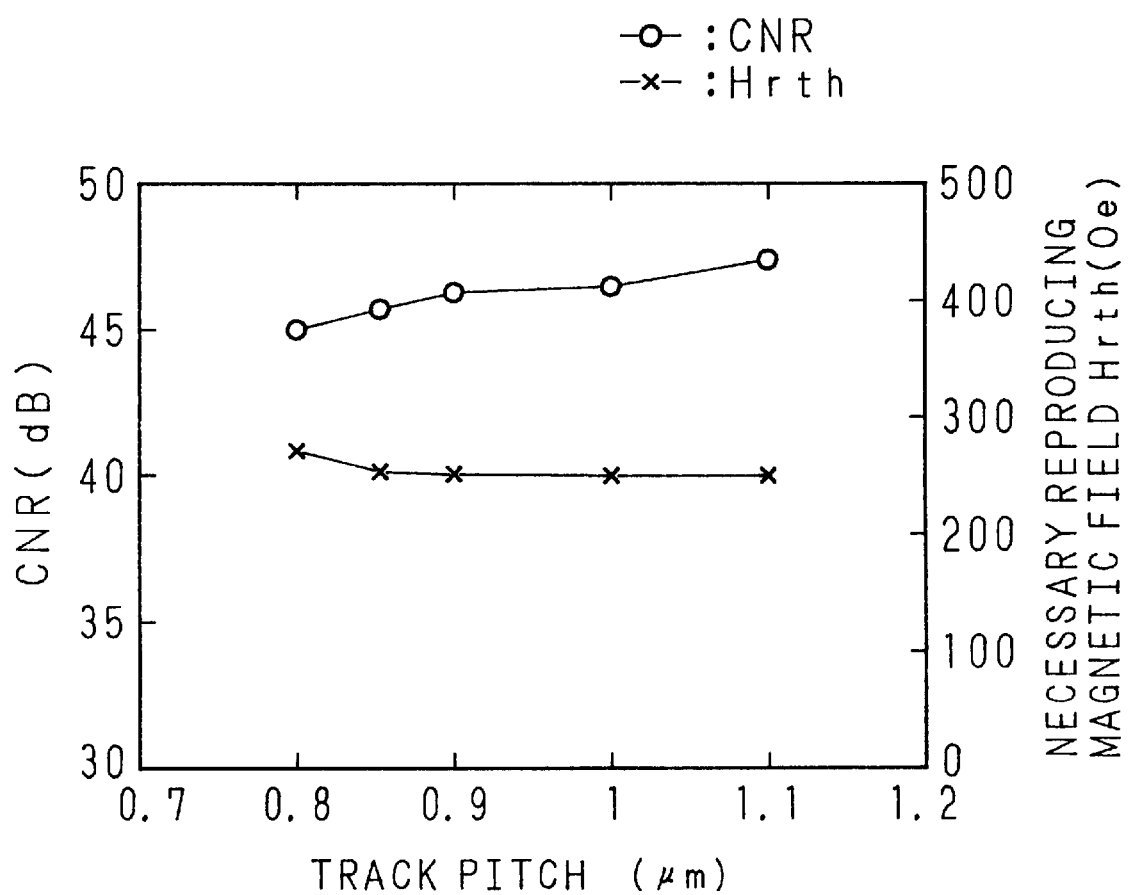
FIG. 17 is a graph for showing a reproducing characteristic against a track pitch and a necessary reproducing magnetic field in a magneto-optical disk of a land recording system according to Embodiment 2.

Embodiment 2:

Magneto-optical disks having the same film structure as that of Embodiment 1 are fabricated by using substrates with different track pitches, and a recording mark with 2T of 0.4 μm is recorded in each of the disks. The respective magneto-optical disks are checked for the necessary reproducing magnetic field and the CNR. FIG. 17 is a graph for showing the results, wherein the ordinate indicates the CNR and the necessary reproducing magnetic field Hrth and the abscissa indicates the track pitch. As is shown in the graph, the CNR tends to be lowered as the track pitch is narrower. In particular, when the track pitch is smaller than 0.9 μm, the CNR is reduced by 1.5 dB or more as compared with the case where the track pitch is 1.1 μm. The necessary reproducing magnetic field is not largely varied in accordance with the track pitch.

Figure 18:
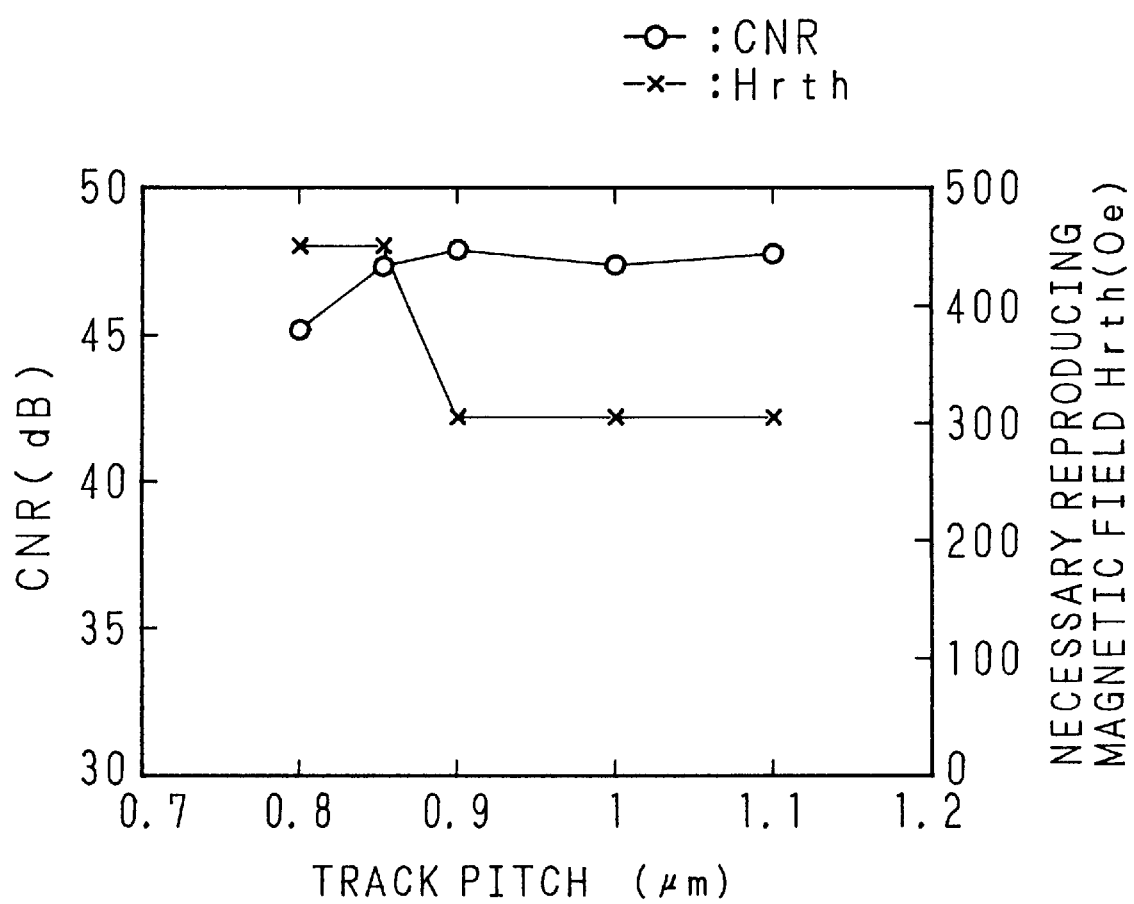
FIG. 18 is a graph for showing a reproducing characteristic against a track pitch and a necessary reproducing magnetic field in a magneto-optical disk of a groove recording system according to Embodiment 2.

Next, magneto-optical disks having the same film structure as that of Embodiment 1 are fabricated by using groove substrates having different track pitches, and are similarly checked for the necessary reproducing magnetic field and the CNR. FIG. 18 is a graph for showing the results, wherein the ordinate indicates the CNR and the necessary reproducing magnetic field Hath and the abscissa indicates the track pitch. In the magneto-optical disks using the groove substrates, the CAR is not lowered when the track pitch is 1.1 μm through 0.85 μm but the necessary reproducing magnetic field is abruptly increased when the track pitch is smaller than 0.9 μm as is shown in the graph. On the basis of the graphs of FIGS. 17 and 18, in order to realize a recording capacity of 1 GB or more by using a magneto-optical disk having the aforementioned film structure, the track pitch can be as narrow as 0.9 μm. Furthermore, when a land substrate is used, the MSR reproduction can be conducted with a narrower track pitch under application of a reproducing magnetic field of 300 Oe or less.

Figure 19:
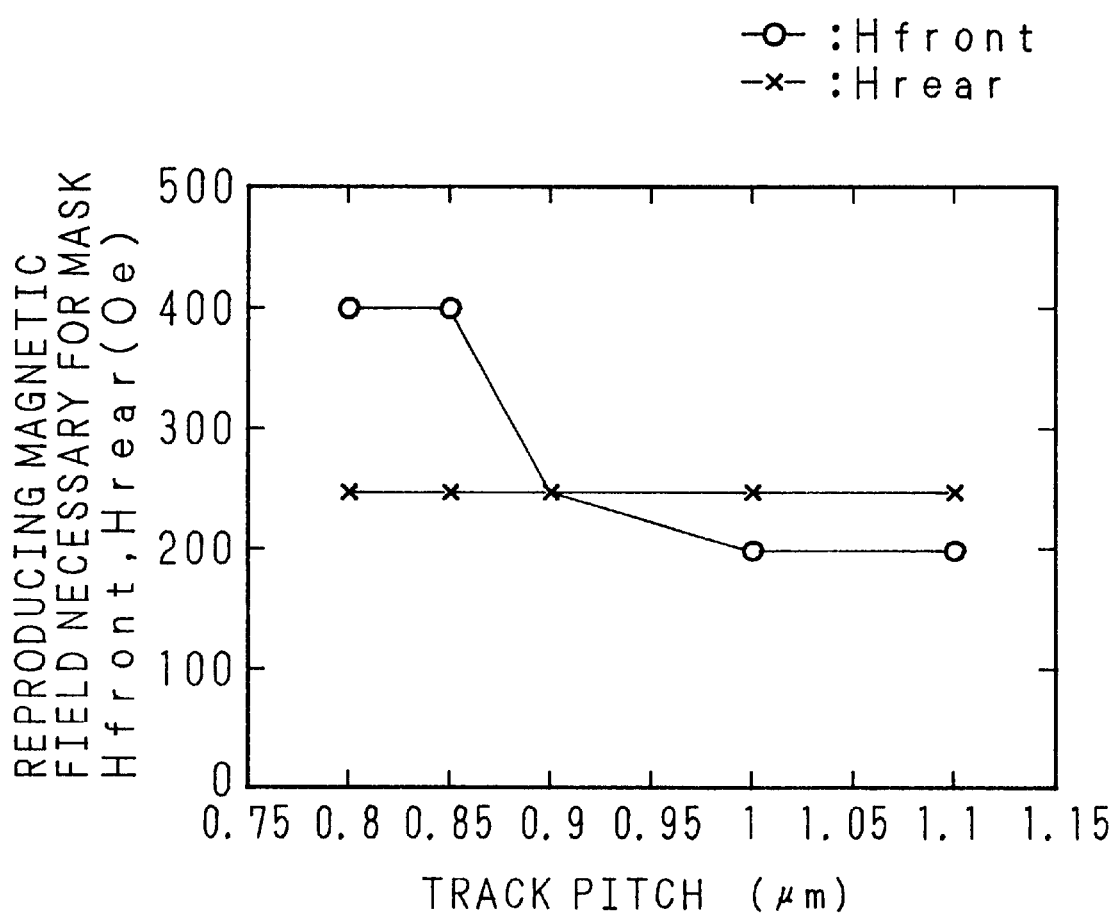
FIG. 19 is a graph for showing the relationship between a track pitch and a reproducing magnetic field necessary for forming a mask in Embodiment 2.
Figure 20:
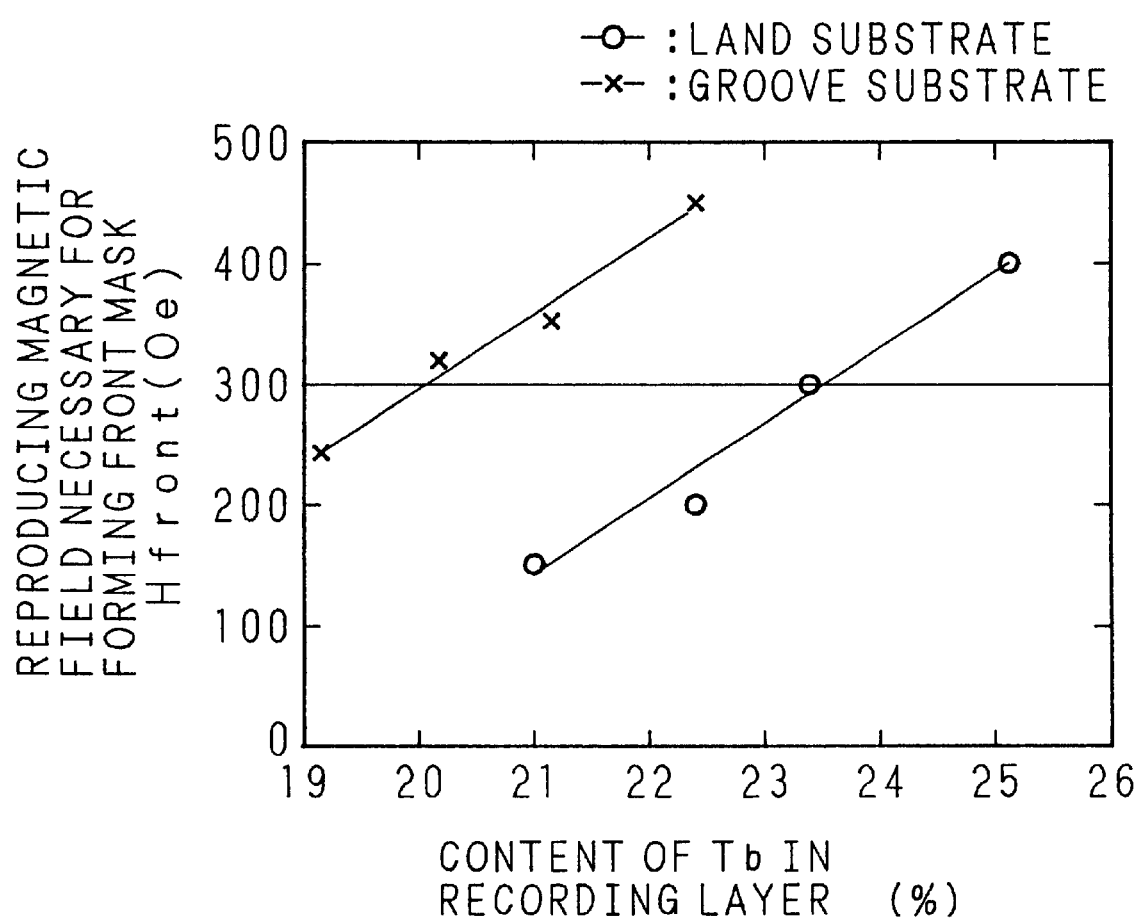
FIG. 20 is a graph for showing the relationship between a recording layer and a reproducing magnetic field necessary for forming a mask in Embodiment 2.

In order to realize reproduction with a further narrower track pitch, necessary reproducing magnetic fields for the front mask and the rear mask are respectively checked by using the aforementioned groove substrates. FIG. 19 is a graph for showing the results, wherein the ordinate indicates the necessary reproducing magnetic field and the abscissa indicates the track pitch. As is obvious from the graph, when the track pitch is narrower than 0.9 μm, the reproducing magnetic field necessary for forming the front mask is abruptly increased. This means that it is because of the formation of the front mask that the necessary reproducing magnetic field increases as the track pitch decreases. Therefore, the composition of the recording layer 16 for reducing the reproducing magnetic field for forming the front mask is examined. FIG. 20 is a graph for showing the result, wherein the ordinate indicates the necessary reproducing magnetic field for forming the front mask and the abscissa indicates the content of Tb in the recording layer 16. In this graph, the result obtained from a land substrate is shown with a mark "○" and the result obtained from a groove substrate is shown with a mark "x". It is understood from the graph that the composition range of the recording layer 16 reproducible by using a reproducing magnetic field of 300 Oe or less is narrower in using the groove substrate than in using the land substrate.

In this manner, on the basis of the graphs of FIGS. 18 through 20, a land substrate is more suitable to the MSR reproduction using a reproducing magnetic field of 300 Oe or less with a narrow track pitch of approximately 0.9 μm than a groove substrate. Furthermore, even though a groove substrate is applicable to the MSR reproduction by adjusting the content of Tb in the recording layer 16, the composition margin of the recording layer 16 is smaller in a groove substrate than in a land substrate. Moreover, it is understood that the necessary reproducing magnetic field can be adjusted by adjusting the saturation magnetization of the recording layer 16 in both a land substrate and a groove substrate. In other words, the MSR reproduction can be conducted by setting the composition of the recording layer 16 in accordance with the track pitch of the substrate and applying a predetermined reproducing magnetic field.

Embodiment 3:

Magneto-optical disks having the same structure as that of Embodiment 1 except for the thickness of the heat conduction layer 18 of AlCr alone are fabricated, and the recording power sensitivity and the SNR as the signal quality are measured. As a result, when the heat conduction layer 18 has a thickness of 8 nm, the SNR is lower by approximately 2 dB than when it has a thickness of 20 nm, and hence the minimum value of jitter cannot be sufficiently small. Furthermore, when the heat conduction layer 18 has a thickness of 10 nm or more, jitter is as low as that of Embodiment 1 (See FIG. 3). Moreover, when the heat conduction layer 18 has a thickness of 30 nm, the recording power sensitivity is lower by approximately 2 mW than when it has a thickness of 8 nm, and hence, data is difficult to reproduce by using the currently used magneto-optical drive. These facts reveal that the thickness of the heat conduction layer 18 of AlCr is preferably 10 nm through 25 nm.

Furthermore, when an AlTi film is used as the heat conduction layer 18, the resultant magneto-optical disk exhibits the same reproducing characteristic as that of Embodiment 1. Also, magneto-optical disks are fabricated by varying the thickness of the AlTi film alone, and the recording power sensitivity and the SNR are measured. As a result, when the heat conduction layer 18 has a thickness of 3 nm, the SNR is lower by approximately 2 dB than when it has a thickness of 15 nm, and hence the minimum value of jitter cannot be sufficiently small. When the heat conduction layer 18 has a thickness of 25 nm, the recording power sensitivity is lower by approximately 2 mW than when it has a thickness of 3 nm, and hence data is difficult to reproduce by using the currently used magneto-optical drive. These facts reveal that the thickness of the heat conduction layer 18 of AlTi is preferably 5 nm through 20 nm. Accordingly, the optimal thickness of the heat conduction layer 18 of the magneto-optical disk of this invention is 5 nm through 25 nm.

Embodiment 4:

Magneto-optical disks having the same structure as that of Embodiment 1 except for the thickness of the lower dielectric layer 13 of SiN are fabricated, and the reflectance, the recording power sensitivity and the SNR are measured. As a result, the magneto-optical disk including the lower dielectric layer 13 with a thickness of approximately 75 nm exhibits the smallest reflectance. When the lower dielectric layer has a thickness of 60 nm, the SNR is lower by approximately 1.6 dB than when it has a thickness of 90 nm, and when the lower dielectric layer 13 has a thickness of 98 nm, the recording power sensitivity is lower by approximately 1.5 mW than when it has a thickness of 60 nm. These facts reveal that the thickness of the lower dielectric layer 13 of the magneto-optical disk 1 is preferably 65 nm through 95 nm, whereas the heat conduction layer 18 is made from an AlCr film. In the case where the heat conduction layer 18 is made from an AlTi film, sufficient recording power can be obtained when the lower dielectric layer 13 has a thickness of 105 nm, and the recording power obtained by a lower dielectric layer with a thickness of 115 nm is out of the allowable range. Accordingly, the optimal thickness of the lower dielectric layer 13 of the magneto-optical disk of this invention is 65 nm through 110 nm.

Next, magneto-optical disks having the same structure as that of Embodiment 1 except for the thickness of the upper dielectric layer 17 of SiN are fabricated, and the recording power sensitivity and the ambient temperature durability are measured. As a result, in the magneto-optical disk including the upper dielectric layer 17 with a thickness of 15 nm, defects such as corrosion are caused when it is allowed to stand at a temperature of 80° C. and a humidity of 85% for 200 hours. Furthermore, when the upper dielectric layer 17 has a thickness of 65 nm, the recording power sensitivity is lower by approximately 2 mW than when it has a thickness of 20 nm. These facts reveal that the thickness of the upper dielectric layer 17 of the magneto-optical disk of this invention is preferably 20 nm through 60 nm.

Figure 21:
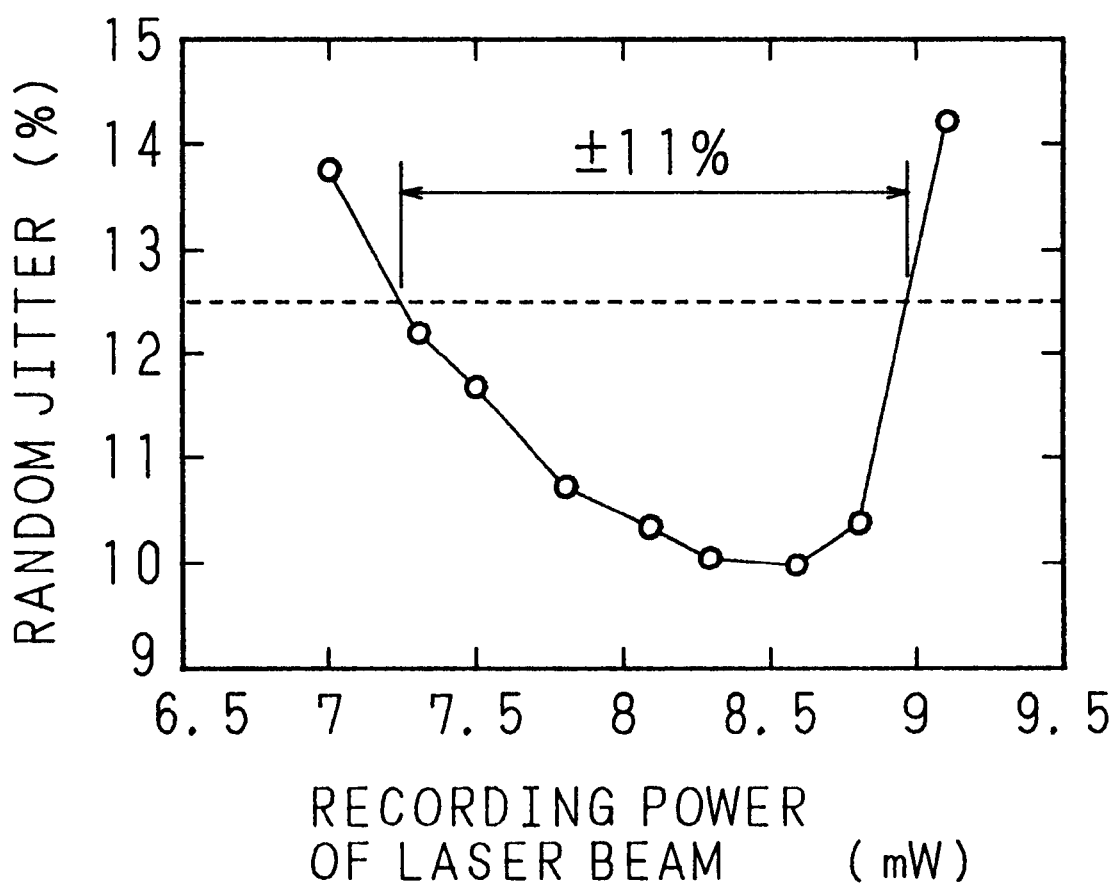
FIG. 21 is a graph for showing a recording power margin of jitter in a magneto-optical disk according to Embodiment 5.

Embodiment 5:

A magneto-optical disk having the same structure as that of Embodiment 1 except for a substrate 12 is fabricated. The substrate used in Embodiment 5 is a land substrate of polycarbonate with a depth of a groove of 93 nm ($\lambda/(4.4 n)$nm) and a land width of 0.75 μm. The other dimensions and structure are the same as those of Embodiment 1 and the description is omitted. This magneto-optical disk is evaluated for random jitter. The results are shown in a graph of FIG. 21. The ordinate indicates the random jitter, and the abscissa indicates the recording power of a laser beam. It is understood from this graph that a recording power margin for attaining random jitter of 12.5% or less is ±11%. Accordingly, the magneto-optical disk where data are to be recorded at a high density has a recording power margin of ±11%, which is sufficiently practical.

Figure 22:
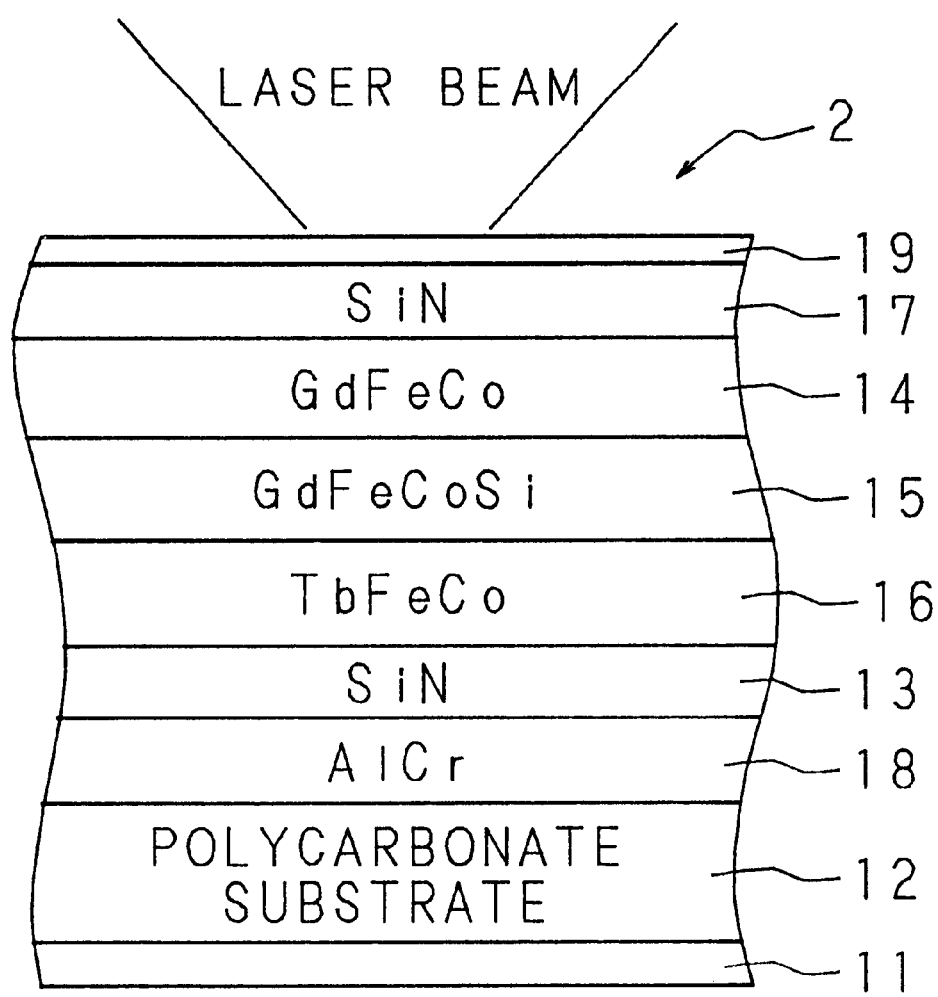
FIG. 22 is a sectional view for showing the film structure of a magneto-optical disk according to Embodiment 6.

Embodiment 6:

FIG. 22 is a sectional view for showing the film structure of a magneto-optical disk according to Embodiment 6. The magneto-optical disk 2 includes a heat conduction layer 18 of AlCr, a lower dielectric layer 13 of SiN, a recording layer 16 of TbFeCo, an intermediate layer 15 of GdFeCoSi, a reproducing layer 14 of GdFeCo, and an upper dielectric layer 17 of SiN, stacked on a substrate 12 of polycarbonate. The outermost layers of the magneto-optical disk 2, namely the surfaces of the substrate 12 and the upper dielectric layer 17 are coated with UV curing films 11 and 19, respectively. The magneto-optical disk 2 is the same as the magneto-optical disk 1 shown in FIG. 1 except for the stacking order of the films. Therefore, descriptions will be omitted of the magnetic characteristics, such as saturation magnetization, Cure temperature and the like, of the magnetic films, the film thickness and the specification of the substrate.

In the magneto-optical disk 2 having the aforementioned film structure, random data with a minimum mark length of 0.38 μm are recorded through optical modulation recording and reproduced at a linear rate of 7.5 m/s for evaluation. In the reproduction, a reproducing magnetic field of 300 Oe is applied in the same direction as in recording the recording marks. The reproducing laser beam is applied through the side far from the substrate 12, namely through the side closer to the reproducing layer 14. The result shows that a magneto-optical disk 2 for high density recording with a recording capacity of 1.3 GB can be reproduced with a sufficient recording power margin of jitter, similarly to Embodiment 1.

The reproducing layer, the intermediate layer and the recording layer of the present magneto-optical disk are not limited to the magnetic films used in the magneto-optical disks of Embodiments 1 through 6. As far as a magnetic film having the aforementioned magnetic characteristics is used, a medium in which data are to be recorded at a high density of 1.3 GB on one side with a 3.5-inch diameter is applicable to the MSR reproduction.

As described so far, a magneto-optical recording medium of this invention uses magnetic films each having saturation magnetization within a predetermined range. Accordingly, a high-density recording medium with a track pitch of 0.9 μm and a minimum mark length of approximately 0.38 μm can be MSR reproduced by applying a reproducing magnetic field of 300 Oe or less. Furthermore, the present magneto-optical recording medium uses the magnetic films each having a Curie temperature within a predetermined range. Accordingly, the magneto-optical recording medium can be reproduced by using a currently used magneto-optical drive, and is compatible with currently used media. Moreover, the present magneto-optical recording medium is excellent in durability against repeated recording/reproducing. In addition, the magneto-optical recording medium having desired magnetic characteristics can be produced with good reproducibility by forming the films so as to attain the predetermined saturation magnetization, thereby ensuring a high density recording and reproduction.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| Stacked Film | Ar Gas Pressure (Pa) | Supplied Power (kW) |
| --- | --- | --- |
| Lower dielectric layer | 2.0 | 2.7 |
| Reproducing layer | 5.0 | 1.0 |
| Intermediate layer | 5.0 | 1.0 |
| Recording layer | 7.0 | 1.0 |
| Heat conduction layer | 0.8 | 2.2 |
| Upper dielectric layer | 2.2 | 2.5 |

What is claimed is:

1. A magneto-optical recording medium having a magnetic film stack structure, comprising:

a recording layer being composed of a magnetic film having an easy magnetization characteristic along a stacking direction and having saturation magnetization of 50 emu/cc through 150 emu/cc at room temperature;

a reproducing layer being composed of a magnetic film having an easy magnetization characteristic along the stacking direction and having saturation magnetization of 8 emu/cc through 100 emu/cc at room temperature; and an intermediate layer being formed from a rare earth transition metal of GdFeCo and a non-magnetic metal selected from a group consisting of Si, Al and Cr between the recording layer and the reproducing layer as a magnetic film having an easy magnetization characteristic along an in-plane direction and having saturation magnetization of 140 emu/cc through 250 emu/cc at room temperature.

2. The magneto-optical recording medium according to claim 1, wherein the recording layer, the reproducing layer and the intermediate layer have Curie temperatures of 240° C. through 350° C., 240 through 350° C. and 160° C. through 220° C., respectively.

3. The magneto-optical recording medium according to claim 1, wherein the reproducing layer is made from a rare earth transition metal of GdFeCo, and the recording layer is made from a rare earth transition metal of TbFeCo.

4. The magneto-optical recording medium according to claim 2, wherein the reproducing layer is made from a rare earth transition metal of GdFeCo, and the recording layer is made from a rare earth transition metal of TbFeCo.

5. The magneto-optical recording medium according to claim 1, further comprising a substrate, a protecting resin layer and a heat conduction layer, wherein the reproducing layer, the intermediate layer, the recording layer and the heat conduction layer are stacked in this order on the substrate, and respective bare surfaces of magneto-optical recording medium are covered with the protecting resin layer.

6. The magneto-optical recording medium according to claim 2, further comprising a substrate, a protecting resin layer and a heat conduction layer, wherein the reproducing layer, the intermediate layer, the recording layer and the heat conduction layer are stacked in this order on the substrate, and respective bare surfaces of the magneto-optical recording medium are covered with the protecting resin layer.

7. The magneto-optical recording medium according to claim 3, further comprising a substrate, a protecting resin layer and a heat conduction layer, wherein the reproducing layer, the intermediate layer, the recording layer and the heat conduction layer are stacked in this order on the substrate, and respective bare surfaces of the magneto-optical recording layer are covered with the protecting resin layer.

8. The magneto-optical recording medium according to claim 1, further comprising a substrate, a resin layer and a heat conduction layer, wherein the heat conduction, the recording layer, the intermediate layer and the reproducing layer are stacked in this order on the substrate, and respective bare surfaces of the magneto-optical recording medium are covered with the resin layer.

9. The magneto-optical recording medium according to claim 2, further comprising a substrate, a resin layer and a heat conduction layer, wherein the heat conduction, the recording layer, the intermediate layer and the reproducing layer are stacked in this order on the substrate, and respective bare surfaces of the magneto-optical recording medium are covered with the resin layer.

10. The magneto-optical recording medium according to claim 3, further comprising a substrate, a resin layer and a heat conduction layer, wherein the heat conduction, the recording layer, the intermediate layer and the reproducing layer are stacked in this order on the substrate, and respective bare surfaces of the magneto-optical recording medium are covered with the resin layer.

11. The magneto-optical recording medium according to claim 5, wherein the heat conduction layer has a thickness of 5 nm through 25 nm.

12. The magneto-optical recording medium according to claim 5, further comprising:

a first dielectric layer with a thickness of 65 nm through 110 nm being formed between the substrate and the reproducing layer; and a second dielectric layer with a thickness of 20 nm through 60 nm being formed between the recording layer and the heat conduction layer.

13. The magneto-optical recording medium according to claim 11, further comprising:

a first dielectric layer with a thickness of 65 nm through 110 nm being formed between the substrate and the reproducing layer; and a second dielectric layer with a thickness of 20 nm through 60 nm being formed between the recording layer and the heat conduction layer.

14. The magneto-optical recording medium according to claim 1, wherein each of the magnetic films is formed on a substrate including a land portion and a groove portion, and a recording mark is formed in the land portion.

15. The magneto-optical recording medium according to claim 2, wherein each of the magnetic films is formed on a substrate including a land portion and a groove portion, and a recording mark is formed in the land portion.

16. A magneto-optical recording medium having a magnetic film stack structure, comprising:

a recording layer being composed of a magnetic film having an easy magnetization characteristic along a stacking direction and having saturation magnetization of 50 emu/cc through 150 emu/cc at room temperature and a Curie temperature of 240° C. through 350° C.;

a reproducing layer being composed of a magnetic film having an easy magnetization characteristic along the stacking direction and having saturation magnetization 8 emu/cc through 100 emu/cc at room temperature and a Curie temperature of 240° C. through 350° C.; and an intermediate layer being formed from a rare earth transition metal of GdFeCo and a non-magnetic metal selected from a group consisting of Si, Al and Cr between the recording layer and the reproducing layer as a magnetic film having an easy magnetization characteristic along an in-plane direction at room temperature and having saturation magetization of 140 emu/cc through 250 emu/cc at room temperature and a Curie temperature of 160° C. through 220° C., wherein each of the magnetic films is formed on a substrate including a land portion and a groove portion, and the land portion has a width of 0.72 $\mu$m through 0.76 $\mu$m and is formed at a pitch of approximately 0.9 $\mu$m.

17. A method of manufacturing a magneto-optical recording medium having a magnetic film stack structure, comprising the steps of:

forming a reproducing layer, on a substrate, which has an easy magnetization characteristic along a stacking direction so as to have saturation magnetization of 8 emu/cc through 100 emu/cc at room temperature;

forming an intermediate layer from a rare earth transition metal of GdFeCo and a non-magnetic metal selected from a group consisting of Si, Al and Cr on the reproducing layer, which has an easy magnetization characteristic along an in-plane direction at room temperature so as to have saturation magnetization of 140 emu/cc through 250 emu/cc at room temperature; and forming a recording layer, on the intermediate layer, which has an easy magnetization characteristic along a stacking direction so as to have saturation magnetization of 50 emu/cc through 150 emu/cc at room temperature.

18. A method of manufacturing a magneto-optical recording medium having a magnetic film stack structure, comprising the steps of:

forming a recording layer, on a substrate, which has an easy magnetization characteristic along a stacking direction so as to have saturation magnetization of 50 emu/cc through 150 emu/cc at room temperature;

forming an intermediate layer from a rare earth transition metal of GdFeCo and a non-magnetic metal selected from a group consisting of Si, Al and Cr on the recording layer, which has an easy magnetization characteristic along an in-plane direction at room temperature so as to have saturation magnetization of 140 emu/cc through 250 emu/cc at room temperature; and forming a reproducing layer, on the intermediate layer, which has an easy magnetization characteristic along a stacking direction so as to have saturation magnetization of 8 emu/cc through 100 emu/cc at room temperature.

19. The method of manufacturing a magneto-optical recording medium according to claim 17, wherein the reproducing layer is made from a rare earth transition metal of GcFeCo, and the recording layer is made from a rare earth transition metal of TbFeCo.

20. The method of manufacturing a magneto-optical recording medium according to claim 18, wherein the reproducing layer is made from a rare earth transition metal of GbFeCo, and the recording layer is made from a rare earth transition metal of TbFeCo.

* * * * *